United States Patent
Buehler et al.

(10) Patent No.: US 10,594,385 B2
(45) Date of Patent: Mar. 17, 2020

(54) FLEXIBLE BEAMFORMING, CHANNELIZATION, AND ROUTING FOLDED PROCESSING ARCHITECTURE FOR DIGITAL SATELLITE PAYLOADS

(71) Applicant: SEAKR ENGINEERING, INC., Centennial, CO (US)

(72) Inventors: Erik Buehler, Centennial, CO (US); Richard E. Perego, Thornton, CO (US)

(73) Assignee: SEAKR ENGINEERING, INC., Centennial, CO (US)

(*) Notice: Subject to any disclaimer, the term of this patent is extended or adjusted under 35 U.S.C. 154(b) by 0 days.

(21) Appl. No.: 15/945,624

(22) Filed: Apr. 4, 2018

(65) Prior Publication Data
US 2018/0287694 A1 Oct. 4, 2018

Related U.S. Application Data

(60) Provisional application No. 62/481,462, filed on Apr. 4, 2017.

(51) Int. Cl.
*H04B 7/0408* (2017.01)
*H04B 7/185* (2006.01)
(Continued)

(52) U.S. Cl.
CPC ....... *H04B 7/18513* (2013.01); *H04B 7/0408* (2013.01); *H04L 49/109* (2013.01);
(Continued)

(58) Field of Classification Search
CPC ... H01Q 3/00; H01Q 3/26; H04B 7/02; H04B 7/04; H04B 7/0408; H04B 7/043; H04B 7/06; H04B 7/0617; H04B 7/0639; H04B 7/0695; H04B 7/08; H04B 7/086; H04B 7/088; H04B 7/0897; H04B 7/14–1555; H04B 7/185–2041; H04L 2012/5608; H04L 2012/6421; H04L 5/00; H04L 5/003; H04L 49/10–1592; H04L 69/26; H04W 16/28; H04W 72/04; H04W 72/046; H04W 74/06; H04W 84/06; H04W 88/00; H04W 88/06
See application file for complete search history.

(56) References Cited

U.S. PATENT DOCUMENTS 6,697,619 B1 * 2/2004 Hogberg .............. H04B 7/2041
455/12.1
7,327,698 B1 * 2/2008 Anselmo ............ H04B 7/18515
370/316
(Continued)

FOREIGN PATENT DOCUMENTS

WO 2018187501 A1 10/2018

OTHER PUBLICATIONS

International Search Report and Written Opinion, PCT/US2018/026129, ISA/US, dated Jun. 28, 2018. (Year: 2018).*
(Continued)

*Primary Examiner* — Timothy J Weidner
(74) *Attorney, Agent, or Firm* — Morrison & Foerster, LLP

(57) ABSTRACT

An electronic device for a communications satellite for beamforming, channelization, and/or routing is implemented using a digital folded architecture to reduce the number of serial communication paths and provide more flexible routing and network configurability and scalability. A method for configuring the switching network of a system comprising multiple electronic devices allows the system to be dynamically reconfigured to implement different types of networks.

19 Claims, 17 Drawing Sheets

(51) Int. Cl.
    *H04L 12/70*     (2013.01)
    *H04L 12/933*    (2013.01)
    *H04W 16/28*    (2009.01)
    *H04W 84/06*    (2009.01)

(52) U.S. Cl.
    CPC ......... *H04L 49/1507* (2013.01); *H04W 16/28* (2013.01); *H04L 2012/5608* (2013.01); *H04W 84/06* (2013.01)

(56) References Cited

U.S. PATENT DOCUMENTS

| | | | |
|---|---|---|---|
| 9,209,891 B1 * | 12/2015 | Mandell ............... | H04B 7/1851 |
| | | | 455/12.1 |
| 10,069,565 B2 * | 9/2018 | Gallagher ............ | H04B 10/118 |
| | | | 398/49 |
| 2004/0185775 A1 * | 9/2004 | Bell .................. | H04B 7/18515 |
| | | | 455/12.1 |
| 2015/0318914 A1 * | 11/2015 | Scott ................. | H04B 7/18513 |
| | | | 370/319 |

OTHER PUBLICATIONS

Gustlin, et al., "Interlaken Technology: New-Generation Packet Interconnect Protocol" Interlaken White Paper, Feb. 2007, pp. 1-16.
Clos, "A Study of Non-Blocking Switching Networks", Manuscript, Oct. 1952, pp. 1-19.
Clos, "Clos Network", Wikipedia, Oct. 2017, pp. 1-5.

* cited by examiner

Clos switching network

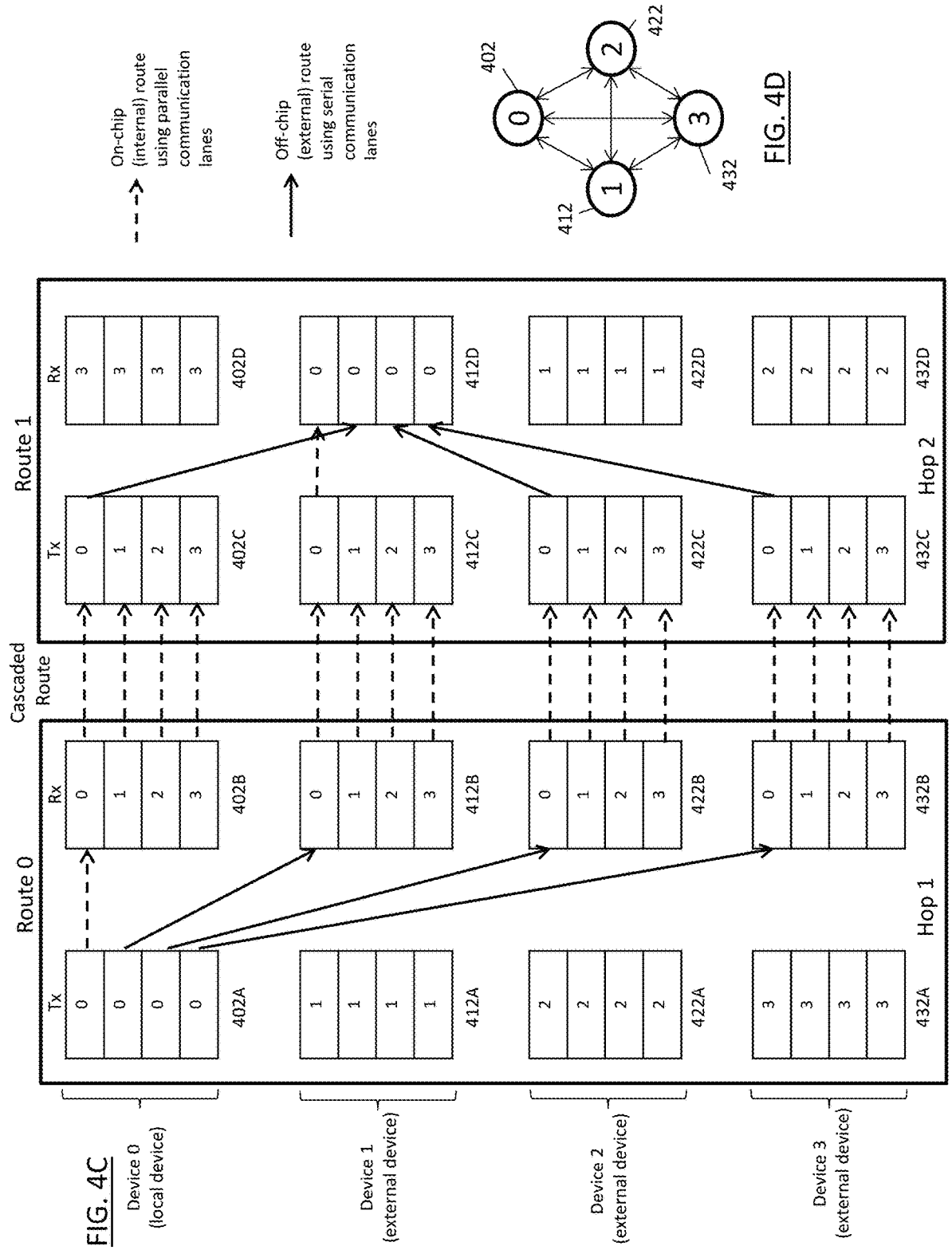

FLEXIBLE BEAMFORMING, CHANNELIZATION, AND ROUTING FOLDED PROCESSING ARCHITECTURE FOR DIGITAL SATELLITE PAYLOADS

CROSS-REFERENCE TO RELATED APPLICATIONS

This application claims priority to U.S. Provisional Patent Application Ser. No. 62/481,462, entitled "Folded Architecture for Satellite Beamforming, Channelization, and Routing," filed Apr. 4, 2017, the content of which is hereby incorporated by reference for all purposes.

FIELD

The present disclosure relates generally to systems and methods for flexibly performing beamforming, channelization, and routing operations on a communications satellite.

BACKGROUND

Communications satellites are responsible for receiving RF signals from ground-based antennas and routing the signals to other ground-based antennas at different locations. The RF signals can carry virtually any type of data, such as voice, video, or Internet traffic. The satellites can provide communications between two locations that it would otherwise be difficult or impossible to communicate between

SUMMARY

In some embodiments, an electronic device comprises an analog-to-digital converter (ADC) circuit connected to an input of the electronic device; a digital-to-analog converter (DAC) circuit connected to an output of the electronic device; a channelizer circuit having an input connected to an output of the ADC, wherein the channelizer circuit is configured to output a first sub-channel signal; a first beamformer circuit configurable to receive a second sub-channel signal on an input of the first beamformer circuit and configurable to output a first output beam signal based on the second sub-channel signal; a reconstructor circuit configured to receive a first input beam signal on an input of the reconstructor circuit, wherein an output of the reconstructor circuit is connected to an input of the DAC circuit; and a switch network capable of receiving a fourth sub-channel signal from a first external device on a first communication connection and receiving a second input beam signal from a second external device on the first communication connection.

In some embodiments, a method comprises, at a digital communication device having a channelizer circuit configured to output a sub-channel signal, a beamformer circuit configured to output a input beam signal or a output beam signal, and a switch network configurable to communicate with the channelizer circuit and the beamformer circuit: configuring the switch network to a first configuration according to first configuration data; while the switch network is in the first configuration outputting a first signal of a first type on a first connection of the switch network; configuring the switch network to a second configuration different than the first configuration according to second configuration data; while the switch network is in the second configuration outputting a second signal on the first connection, wherein the second signal is different than the first signal and the second signal is of a second type different than the first type.

In some embodiments, a satellite communication system comprises a first communication circuit having a first analog to digital converter (ADC) configurable to convert a first radio frequency (RF) input signal to a first digital signal, a first channelizer circuit configurable to generate sub-channel signals from digital signals, a first beamformer circuit configurable to generate beam signals, a first reconstructor circuit configurable to generate reconstructed digital signals, a first digital to analog converter (DAC) circuit configurable to convert a reconstructed digital signal to an RF output signal, and a first routing network configurable to route signals of the first communication circuit. The system also includes a second communication circuit having a second ADC, a second channelizer circuit, a second beamformer circuit, a second reconstructor circuit, a second DAC, and a second routing network configured to route signals of the second communication circuit. The system also includes a communication network having a plurality of communication lanes communicatively coupleable to the first communication circuit and the second communication circuit. The first routing network is configurable to transmit a first portion of the first digital signal to at least one of the first channelizer circuit, the first beamformer circuit, or the first reconstructor circuit. The first routing network is also configurable to transmit a second portion of the first digital signal different than the first portion to the second communication circuit via the communication network.

In some embodiments, an electronic device comprises an analog-to-digital converter (ADC) circuit connected to an input of the electronic device. The device also includes a digital-to-analog converter (DAC) circuit connected to an output of the electronic device. The device also includes a channelizer circuit having an input connected to an output of the ADC, wherein the channelizer circuit is configured to output a first sub-channel signal. The device further includes a first beamformer circuit configurable to receive a second sub-channel signal on an input of the first beamformer circuit and configurable to output a first output beam signal based on the second sub-channel signal. The device also includes a reconstructor circuit configured to receive a first input beam signal on an input of the reconstructor circuit. An output of the reconstructor circuit is connected to an input of the DAC circuit. A switch network of the device is capable of receiving a first signal and a second signal on a first communication channel, wherein the first signal and the second signal are different types of signals.

BRIEF DESCRIPTION OF THE DRAWINGS

FIG. 4A-4C depicts exemplary flexible routing and switching configurations.

DETAILED DESCRIPTION

Communications satellites receive RF signals from ground-based source devices or antennas, such as very small aperture terminals (VSATs), ground stations, stationary or mobile users on the ground, gateways, high altitude assets such as drones, planes, or balloons, and the like, and use a system of switches to route the signals to appropriate destination devices or antennas. This process typically requires signal channelization, routing, and (in some cases) beamforming on the satellite to improve performance and optimize spectrum re-use. Systems and methods that provide flexible beamforming, channelization, and/or routing functionality while reducing hardware power, cost, and/or weight are desirable.

Figure 1:
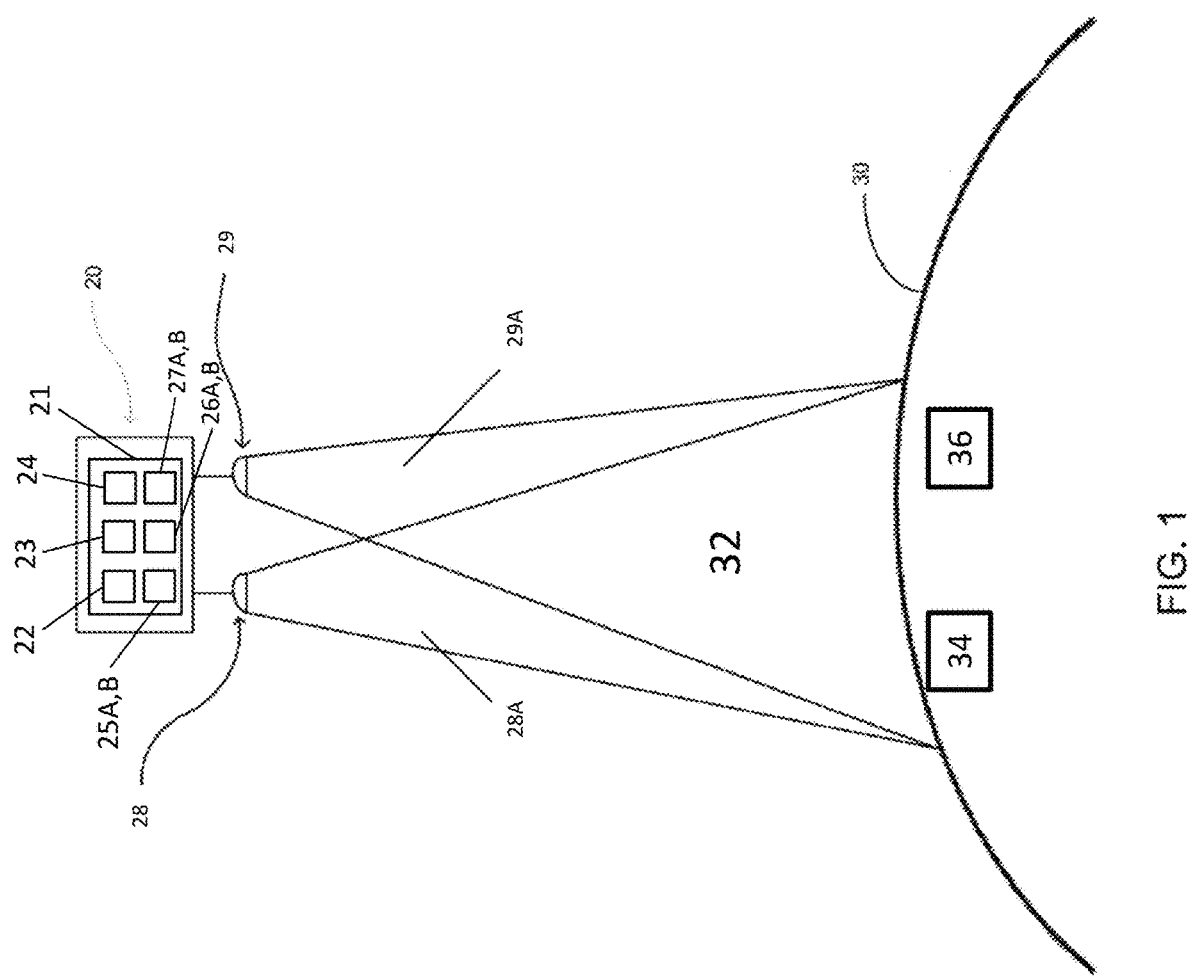
FIG. 1 depicts an exemplary communications satellite with transmit and receive antennas.

FIG. 1 depicts a communications satellite 20 with a receive antenna 28 and a transmit antenna 29 that receive and transmit data via RF signals in respective cones 28A and 29A from and to the patch of ground 32 on the surface of Earth 30. In some examples antennas 28 and 29 may be constructed as aperture antennas including parabolic reflectors, horns, or dielectric lenses. In other examples, antennas 28 and 29 may each include multiple antenna elements forming a phased array or direct radiating array antenna. Although the cones 28A and 29A are illustrated as overlapping, the present disclosure is not limited to this and the receive cone 28A may cover a first patch of ground while the transmit cone 29A may cover a second patch of ground.

The satellite 20 may include, among other things, a satellite payload 21 having a payload processor 22, a storage device 23, a switching network 24, a beamforming (BF) modules 25 for input beamforming and output beamforming, analog-to-digital converters (ADCs) 26A and digital-to-analog converters (DACs) 26B, and channelizers 27A and reconstructors 27B. In some examples, the payload processor 23 may be a central processing unit (CPU) such as a microprocessor, application specific integrated circuit (ASIC), a field programmable gate array (FPGA) and the like. In some examples a storage device 23 may be a solid state device (SSD), flash memory, random access memory (RAM) including SRAM, DRAM, non-volatile memories such as NAND or NOR flash, magnetoresistive RAM (MRAM), ferroelectric RAM (F-RAM), phase-change RAM (PCRAM), chalcogenide RAM (CRAM), and the like, for storing payload configuration information. Payload configuration information may include, for example, routing tables, routing configuration information, beamforming weighting tables, channelizer and reconstructor configuration, antenna driving configuration, user location and user channel data, radiation detection and mitigation algorithms, and the like. The switch network 24, as will be described in more detail below, may include a multi-stage switch network 24 designed to route data signals extracted from RF signals to among the various modules, devices, and units of the satellite 20.

It is noted that although illustrated as separate modules, the storage device 23, switching network 24, beamforming units 25, ADC 26A, DAC 26B, channelizer 27A, and reconstructor 27B may be provided on a single monolithic silicon device, such as an ASIC or FPGA. In other examples, the storage device 23, switching network 24, beamforming units 25, ADC 26A, DAC 26B, channelizer 27A, and reconstructor 27B may be integrated on a single die or multiple die within a single package, such as a multi-chip module or a hybrid device including active and passive integrated circuit (IC) elements. By implementing all of the payload components discussed above in a single package many advantages may be realized, including lower latency among components, reduced signal degradation, reduced electrical resistance between modules and thus less power loss, and the like. As will be discussed below, satellites components such as the payload 21 of satellite 20 are subjected to increased radiation in space as satellites 20 do not benefit from the shielding effect of earth's geomagnetic shield. In some examples, by integrating the storage device 23, switching network 24, beamforming units 25, ADC 26A, DAC 26B, channelizer 27A, and reconstructor 27B in a single package, some or all of these elements can be made radiation hard or radiation tolerant. In doing so, radiation effects, as discussed in more detail below, may be detected temporally and spatially close to the affected module or component to more quickly and efficiently compensate for or otherwise mitigate the radiation effects.

Furthermore, although the beamforming units 25, channelizer 27A, and reconstructor 27B are illustrated as separate units, these components may be implemented in a digital signal processing (DSP) core configured with a DSP algorithm for performing input beamforming, output beamforming, channelization, and/or reconstruction. In some examples, more than one DSP core may be included in the payload 21.

In some examples, satellite 20 may enable a first device 34 on the patch of ground 32 to communicate with or transmit data between a second device 36 at a different location on the patch of ground 32. The corresponding RF signals including the data to be communicated between devices 34 and 36 may be received by the receive antenna 28 and sent to the second device via the transmit antenna 29. A received RF signal may include a frequency band commonly referred to as a channel. The received RF channel may be divided by a channelizer into multiple smaller frequency slices, which may be called sub-channels. These sub-channels may subsequently be re-combined by a reconstructor into a transmit RF signal.

Satellites, such as satellite 20, may incorporate beamforming functionality of channels or sub-channels at both the receive side (input beamforming) and transmit side (output beamforming) sides to improve signal quality and facilitate frequency re-use. Beamforming is a signal processing technique for improving the directionality of signals received or transmitted by multiple antenna elements. Beamforming may be performed by controlling the phase and/or amplitude of the signals from each element such that particular angles relative to the plane of the antenna element array experience constructive interference while other angles relative to the antenna array plane experience destructive interferences. Beamforming may also strengthen desired frequencies and attenuate undesired frequencies. In some cases, beamforming is performed by multiplying each signal associated with an antenna element by a certain weight, such as in a phased array or direct radiating array (DRA). In some examples, beamforming may include phase shifting each signal associated with an antenna element by a certain amount, such as using a phased array. Beamforming can be performed in the analog and/or digital domain. Accordingly, the receive antenna 28 and transmit antenna 29 of the satellite 20 may in some examples be a phased array, direct radiating array, and the like, each of which include multiple antenna elements each.

A typical signal flow for an RF signal received at a satellite incorporates beamforming, channelization, and routing prior to transmission of the signal back to Earth. Historically, these functions have been performed using primarily analog components, though in recent years digital beamforming and/or channelization systems have become more common.

The systems and methods set forth in the present disclosure can be used in satellite 20 having, for example, a phased array or direct radiating array receive antenna 28 and transmit antenna 29. In particular, receive antenna 28 may have multiple spatially diverse receive (Rx) antenna elements coupled to a digital folded architecture for beamforming, channelization, and routing. Systems and methods set forth in the present disclosure may also include multiple spatially diverse transmit (Tx) antenna elements in a transmit antenna 29 coupled to the digital folded architecture. As discussed above, the receive (Rx) antenna 28 and transmit (Tx) antenna 29 may in some examples include overlapping fields of view of Earth, while in other examples they may have diverse fields of view of Earth. In some embodiments, a digital folded architecture receives multiple RF input signals corresponding to multiple Rx antenna elements, digitizes the input signals using an ADC 26A, divides the digitized RF input signal into plural sub-channels using a channelizer 27A, and processes the sub-channels using input beamformer 25A, and routes via a switching network 24 the digital beam signals to produce, using the reconstructor 27B and output beamformer 26B, multiple RF output signals corresponding to antenna elements of the transmit antenna 29. In some examples, satellite 20 may be a commercial communications satellite, but the present disclosure is not limited to this and satellite 20 may be another type of satellite capable of receiving and/or transmitting RF signals.

Figure 2:
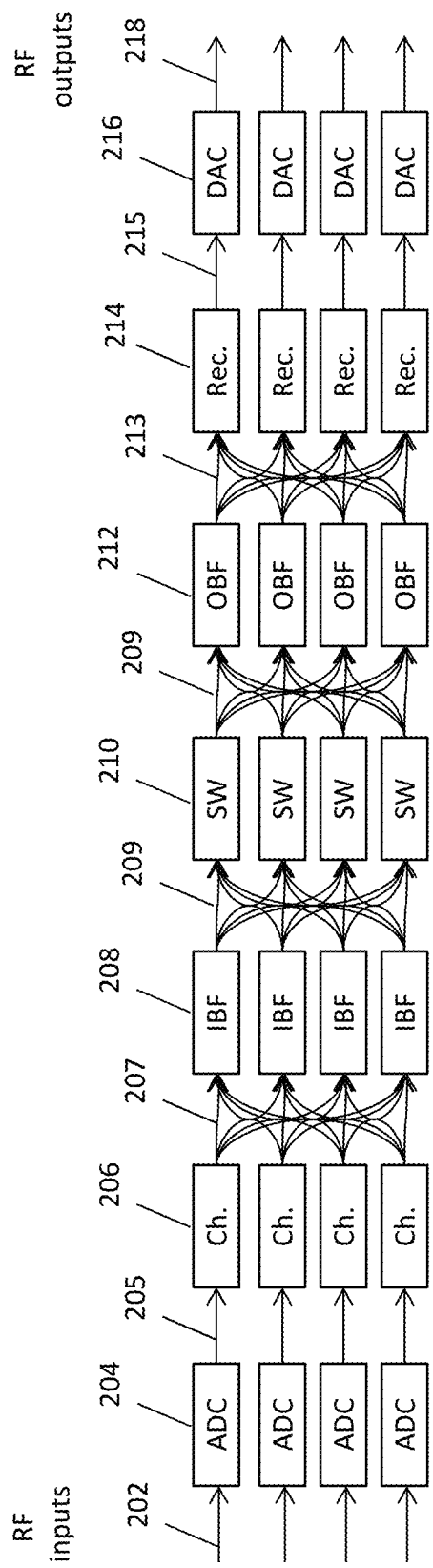
FIG. 2 depicts an exemplary system architecture that may be used for channelization, beamforming, and routing on a satellite.

An exemplary non-folded implementation of the above-described functions is depicted in FIG. 2. The channelization/beamforming/routing architecture depicted in FIG. 2 includes multiple function blocks that may be implemented in hardware, software, or a combination of the two. In this example, the satellite receives input RF signals 202 that include one or more channels, which are transmitted to analog to digital converter (ADC) circuits 204. The ADCs produce digital channels 205 that are the digital equivalents of the multiple channels contained in the received RF signals. The digital channels 205 are then divided into sub-channels 207 by channelizer circuits 206. Channelizer circuits 206 may use a variety of signal processing techniques to divide the channels into sub-channels, such as signal filtering with a polyphase filter bank, for example. Channelizer circuits 206 route sub-channels 207 to input beamformer circuits 208, typically based on sub-channel frequency, such that different sub-channel frequencies may be beamformed using different input beamformer circuits 208. The input beamformer circuits 208 may use various beamforming techniques to generate input beam signals 209. Such beamforming techniques may include phase shifting and/or multiplication by a set of weights, for example.

The input beam signals 209 are transmitted to switch networks 210, which route the input beam signals 209 to output beamformer circuits 212. Such routing may be based on the desired ground-based destination of the signal (e.g., the destination associated with the target device, user, or VSAT), for example. The output beamformer circuits 212 generate output beam signals 213 and transmit the output beam signals 213 to reconstructor circuits 214 that reconstruct time-domain signals 215 from the output beam signals. Systems as set forth in the present disclosure may in some examples incorporate time-division multiple access (TDMA) of input and output signals and beams. The reconstructor circuits 214 send the reconstructed output beam signals to digital-to-analog converter circuits 216 (DACs), which generate output RF signals 218 for transmission back to Earth.

In the exemplary system of FIG. 2, each arrow represents one or more communication connections, such as physical wires, copper traces, and the like. The actual number of communication connections that are implemented between chips may vary depending on the RF input bandwidth and the granularity of the channelization (e.g., the frequency range of the sub-channels or the number of sub-channels per frequency range). Each of the communication connections depicted in FIG. 2 is dedicated to carrying one particular signal type, such as a channel 205, a sub-channel 207, or a beamformed input or output signal 209 or 213, for example.

Typically, a digital implementation of the system depicted in FIG. 2 uses a separate physical device or chip—such as a microprocessor chip, field-programmable gate array (FPGA), or application-specific integrated circuit (ASIC)—for each function or circuit (e.g., ADC, DAC, channelizer circuit, beamformer circuit, reconstructor circuit, switch network) with the communication connections (e.g., wiring) as depicted. Such wiring is often implemented using serial communication connections (e.g., SerDes lanes, LVDS lanes, Serial Peripheral Interface (SPI), MIL-STD-1553A/B, SpaceWire, and the like) since inter-chip parallel signal lines and the associated IO pins on the physical devices are costly to implement in terms of, for example, die area, board area, system weight, power consumption, and reliability.

In the circuit-switched implementation depicted in FIG. 2, signals flow from left to right—so the communication connections operate unidirectionally. For SerDes lanes, each unidirectional communication connection requires a single wire pair for differential signaling. Bidirectional SerDes lanes require two wire pairs each.

Figure 3:
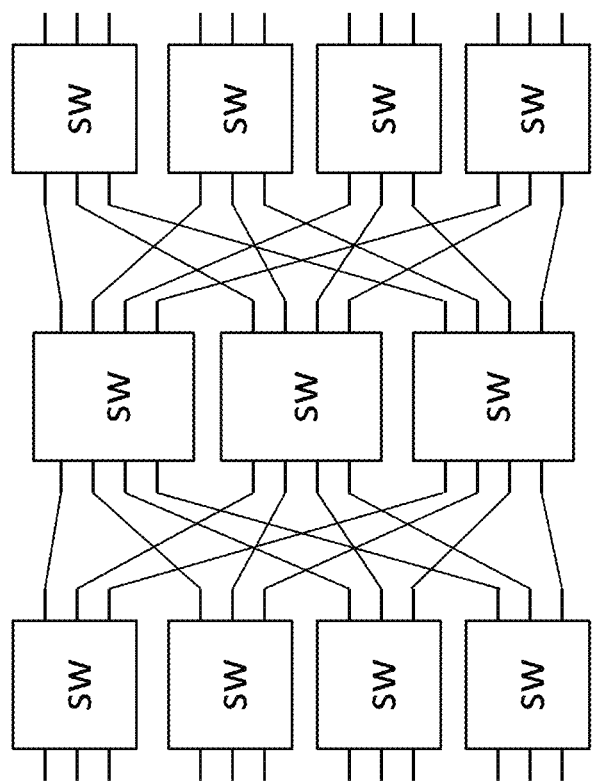
FIG. 3 depicts a three-stage Clos switching network.

The switch networks 210 used to route the input beams 209 to the output beamformers 212 may be implemented using a variety of switching network topologies. These may include strictly or rearrangeably non-blocking unicast or multicast network topologies, such as various forms of Clos or Benes switching networks (a Benes network is a specific implementation of a Clos switching network), for example. An exemplary three-stage strictly non-blocking unicast Clos switch network 310 is depicted in FIG. 3. The three-stage Clos switch network 310 depicted in FIG. 3 provides any-to-any routing connectivity between its inputs and outputs. More generally, Clos networks can provide strictly non-blocking or rearrangeably non-blocking switching performance if certain constraints are met.

Specifically, a Clos switching network in its simplest configuration includes a three-stage switching network having ingress, middle, and egress switching stages. Each of these Clos network stages are comprised of an array of crossbar switches (also referred to just as "crossbars"), which are spatial, physical switches. By definition, the number of middle stage crossbars is determined by the number of outputs from the ingress stage crossbars, and the number of inputs and outputs of the middle stage crossbars matches the number of crossbars in the ingress and egress stages. A Clos switch may be expanded to include more than 3 switching stages by replacing a middle stage of an existing Clos switch with another 3-stage Clos switch network. Accordingly, Clos switches may be expanded to include 3, 5, 7, 9, 11, or any other odd number of stages. Therefore, Clos switching networks, by definition, cannot be constructed with an even number of switching stages.

As described above, a Clos switch routes all signals incident on the ingress ports regardless of what the signal contains. In a communications satellite scenario, this would mean that all incoming channels and sub-channels would be routed when the switching fabric is constructed as a Clos switch network. Accordingly if 1024 subchannels were to be incident on a Clos switching network, but only a fraction of those subchannels (e.g., 800) are of interest to the mission or to the user (a common occurrence), a Clos switch network would still route all 1024 sub-channels, wasting valuable switching lanes and power on sub-channels which would not be used by the user or satellite operator.

On the contrary, the switching network of the present disclosure, as will be described more fully below, is not constrained in this way and is instead configured to be more flexible and scalable than an array of physical crossbar switches as required in a Clos switch network. Particularly, any-to-any routing of input ports to output ports can be achieved without implementing a Clos switch network, especially if only a finite number of the ingress ports or sub-channels are to be routed, such as in the case of satellite communications as described above (where, for example, only 800 sub-channels of 1024 total sub-channels would be of interest to the user). The switching architecture of the present disclosure is flexible enough to accommodate a variety of possible routing plans, leveraging foreknowledge of the desired pipeline configuration, subchannel size and spacing, beamforming parameters, desired user/beam mapping, and peak serial communication link bandwidth. Analytical models may be used to determine if a particular routing plan is feasible or infeasible, and that capacity is scaled appropriately (e.g., serial communication lane capacity, such as SerDes lanes capacity, is not exceeded). In this architecture, only sub-channels or beams which contain valid data are routed, avoiding wasted bandwidth and power. This vastly improves efficiency and reduces power consumption which may result from routing sub-channels which are not in use, while also avoiding the situation where switching lanes are un-necessarily occupied by sub-channels which are not used by or of interest to the user. Further, the switching architecture of the present disclosure is provided by bi-directional data transmission lanes such as, for example, SerDes lanes, low voltage differential signaling (LVDS), Serial Peripheral Interface (SPI), MIL-STD-1553A/B, SpaceWire, and the like. Clos switching networks per se are generally incompatible with bi-directional data flow without the provision of a secondary or tertiary Clos switch network for a return data flow direction.

Figure 4A:
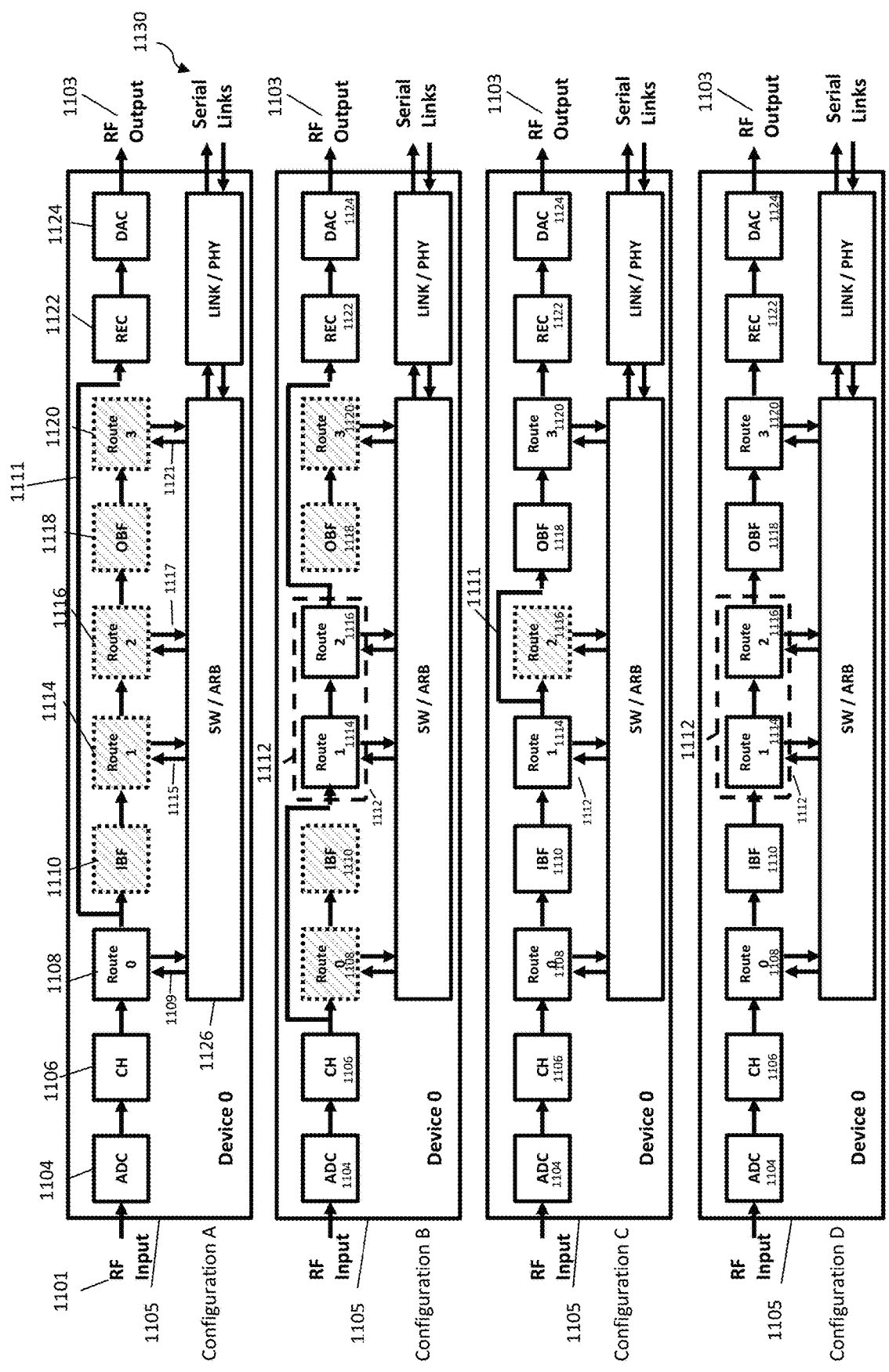
Figure 4B:
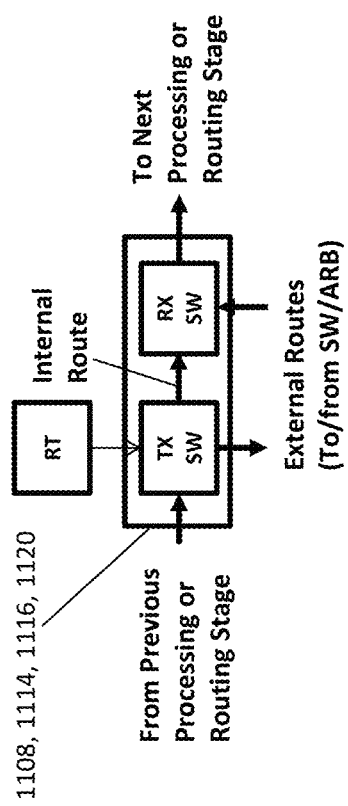

As illustrated in FIG. 4A-4B, the switching network architecture of the present disclosure's folded processor architecture may be configured in a large variety of ways depending on requirements of the user and/or the mission. As the number of users or subscribers of the folded processor architecture and/or a satellite payload containing the folded processor architecture, as described below, changes over time the switching network architecture may be flexibly updated to accommodate additional capacity, different beamforming processing, different channelization and reconstruction processing, and the like. Each configuration in FIG. 4A may include a device 1105 including an ADC 1104, a channelizer 1106, a routing stage 1108, an input beamformer (IBF) 1110, an internal route stage 1111, a cascaded routing stage 1112 including routing stages 1114 and 1116, an output beamformer (OBF) 1118, a routing stage 1120, a reconstructor 1122, and a DAC 1124. RF input signals 1101 may be input to the device 1102A at the ADC 1104 and RF output 1103 may be output by DAC 1124. Routing stages 1108, 1114, 1116, and 1120, which may in some examples be time-based switches such as time-slot interchangers (TSIs) may be communicatively and bidirectionally coupled with an arbiter/switch 1126. Grayed-out and dashed boxes represent routing stages or processing stages not in use and may be powered down (e.g., IBF 1110, routing stage 1114, routing stage 1116, OBF 1118, and routing stage 1120 in configuration A).

FIG. 4A depicts four exemplary configurations of a device 1105. In configuration A, device 1105 may be configured to perform channelization and reconstruction processing stages only. When an RF input 1101 is received at ADC 1104, the channelizer 1106 may divide the RF input channel into multiple smaller frequency slices, often referred to as sub-channels. All or a portion of these sub-channels may be routed, at routing stage 1108, to the arbiter/switch 1126 for routing to another device, such as another device 1105, via serial links 1130. Sub-channels from another device 1105 may also be received over serial links 1130 for routing at route stage 1108 to reconstructor 1122. All or a portion of the sub-channels from channelizer 1106 may additionally or alternatively be routed on-chip at routing stage 1108 to a reconstructor 1122 over an internal route path 1111, where they may be re-combined by a reconstructor into a transmit RF output signal.

In configuration B, device 1105 may be configured to perform channelization and reconstruction processing stages only. When an RF input 1101 is received at ADC 1104, the channelizer 1106 may divide the RF input channel into multiple smaller frequency slices, often referred to as sub-channels. All or a portion of these sub-channels may be routed, at routing stage 1108, to the arbiter/switch 1126 for routing to another device, such as another device 1105, via serial links 1130. Sub-channels from another device 1105 may also be received over serial links 1130 for routing at route stage 1108 to reconstructor 1122. All or a portion of the sub-channels from channelizer 1106 may additionally or alternatively be routed at routing stage 1108 to a cascaded route stage 1112. The cascaded route stage 1112 may route all or a portion of the sub-channels from channelizer 1106 to an arbiter/switch 1126 for routing to another device, such as another device 1105, via serial links 1130. Sub-channels from another device 1105 may also be received over serial links 1130 for routing at route stage 1108 to reconstructor 1122. A portion of the sub-channels or other data from the local device 1105 may be routed, at routing stage 1114, to a routing stage 1116 on the local device. At routing stage 1116, sub-channels and other data may be routed to a reconstructor 1122 over internal route path 1111. By providing a cascaded route path 1112, a more flexible bandwidth allocation may be achieved by allowing data to be at least partially routed on-chip while allowing data from external devices 1105 to be received by a local device 1105. This two-hop routing configurability (as seen in FIG. 4C), combined with bidirectional serial communication links 1130 between one or more devices 1105 (as seen in FIG. 4D), enables more bandwidth to be transmitted and received by devices 1105 over fewer serial communication links 1130 than would be required if only one routing hop were performed.

Configuration C may be substantially similar to configuration A with the exception that configuration C includes additional processing stages such as an input beamformer stage IBF 1110 and output beamformer stage OBF 1118, provided between routing stages 1108 and 1120. At routing stage 1114, all or a portion of IBF beams may be routed to the arbiter/switch 1126 for routing to another device, such as another device 1105, via serial links 1130. Similarly, IBF beams from another device 1105 may also be received over serial communication links 1130 for routing at route stage 1108 to an output beamformer OBF 1118. At routing stage 1114, all or a portion of IBF beams from IBF 1110 may be routed, via an internal route 1111, to output beamformer OBF 1118.

Configuration D may be substantially similar to configuration B with the exception that configuration D includes additional processing stages such as an input beamformer stage IBF 1110 and output beamformer stage OBF 1118, provided between routing stages 1108 and 1120. At routing stage 1114, all or a portion of IBF beams may be routed to the arbiter/switch 1126 for routing to another device, such as another device 1105, via serial links 1130. Similarly, IBF beams from another device 1105 may also be received over serial communication links 1130 for routing at route stage 1108 to an output beamformer OBF 1118. At routing stage 1114, all or a portion of IBF beams from IBF 1110 may be routed, via an internal route 1111, to output beamformer OBF 1118.

As discussed above with respect to configurations A-D, a device 1105 may be selectively and flexibly reconfigured based on the type of processing desired. Although each device 1105 may include channelizers 1106, input beamformers 1110, output beamformers 1118, reconstructors 1122, these processing stages do not always have to be utilized and may selectively be routed around and powered down. The interconnection of devices 1105 via arbiter/switches 1126 and serial communication links 1130, in combination with flexible and reconfigurable routing stages, allow for flexible bandwidth allocation of sub-channel signals, beam signals from input beamformers, and/or beam signals from output beamformers on different devices 1105.

Devices 1105 may be implemented in a single package, where the package may be provided on a card or a board having multiple packages and other modules electrically or physically coupled thereto. In some examples, the devices 1105 are integrated package may comprise a single monolithic silicon device (e.g., a single die), a multi-chip module (e.g., multiple dies), or a hybrid device having active and passive electrical circuitry, all integrated in a single package.

With reference to FIG. 4B, the route stages 1108, 1114, 1116, and 1120 on devices 1105 in FIG. 4A may in some examples each include a transmit switch (TX SW), receive switch (RX SW), which may be TSI switches, space switches, or a combination of time-based and space-based switches. These switches may include memory devices, such as random access memory (RAM), flash memory, and the like, configured to buffer, reorder, and/or deskew data. A routing table (RT) may be provided for the routing stages 1108, 1114, 1116, and/or 1120 to control the flow of data, sub-channels, input beams, output beams, and the like, within the folded processor architecture pipeline. In some examples, the routing tables of each routing stage may collectively represent a particular configuration of the device 1105. In other examples, one or more routing tables may represent a particular configuration of the device 1105. The routing tables of each routing stage may be remotely reconfigured by, for example, a remote user located at a terrestrial asset such as a ground station, gateway, command center, and the like. The reconfigurability of the routing tables in combination with the number of routing stages and the flexibility offered by the device 1105 allows for flexible bandwidth allocation of data signals, beams, sub-channels, and the like to among a local and remote device 1105 interconnected by serial communication links 1130 (see for example the discussion of FIG. 11 below, wherein devices 1105 may be substantially similar to devices 1102A-1102D of FIG. 11).

Although four configurations A-D are depicted, the flexibility of the folded processor architecture and switching network as disclosed herein is not limited to this, and alternate configurations are within the scope of the present disclosure.

FIGS. 4C and 4D provide a simplified example of how data can be routed using two hops to deliver more bandwidth between a given pair of devices than would be possible using a single hop route. FIG. 4D shows 4 devices connected in a full bi-directional mesh topology with equal bandwidth between all devices. In this topology, one-third of each device's external bandwidth is allocated to each of the three neighboring devices.

FIG. 4C illustrates an example of data flow in an exemplary route plan where all of the data associated with Device 0's Tx stage 402A is desired to be routed to Device 1's RX stage 412D. During a first hop, 25% of the data in Tx stage 402A is routed to each of Devices 1-3's Rx stage 402B, 412B, 422B, and 432B, respectively. It is noted that in this example that for Device 0, the path from Tx stage 402A to RX stage 402B is an internal route and data is routed on-device or on-chip route over parallel communications lanes, whereas data transmission to the Rx stages 412B, 422B, 432B of Devices 1-3, respectively, is an external route off-chip or off-device over serial communications lanes (e.g., SerDes lanes, LVDS lanes, Serial Peripheral Interface (SPI), MIL-STD-1553A/B, SpaceWire, and the like). By cascading two routing stages back-to-back, any data received into Rx stages 402B, 412B, 422B, and 432B can be fed into the next Tx stages 402C, 412C, 422C, and 432C, respectively, again using internal paths within each device (i.e., routing or transmitting data on-chip or on-device over high speed, low power consumption parallel communication connections such as physical wires, conductive traces, and the like). For the second hop route, each device routes 25% of the route bandwidth from its Tx stage 402C, 412C, 422C, and 432C to the target Device 1's RX stage 412D. Note that for the second hop, the path from Device 1's TX stage 412C to RX stage 412D is an internal route on-chip or on-device. In this example, the internal routes combined with the ability to cascade routes on any device allows a reduction in the amount of data and bandwidth transmitted externally, thus reducing power consumption of the serial communications lanes (e.g., SerDes lanes), while also allowing for the possibility of routing more bandwidth than would otherwise be possible with direct, physical connections between all of the Devices (as illustrated in the multi-device system of FIG. 2, for instance).

FIG. 4D illustrates a high-level view of the bidirectional inter-chip or inter-device serial communication connections represented. Each device 402, 412, 422, 432, corresponding to Devices 0-3 respectively, is interconnected using serial communication connections such as, for example the serial communications connections 1130 (e.g., SerDes lanes, LVDS lanes, Serial Peripheral Interface (SPI), MIL-STD-1553A/B, SpaceWire, and the like) of FIGS. 4A and 11. Accordingly, if data needs to be transferred to Device 1 from Device 0, but the serial connection between Devices 0 and 1 is at capacity, a portion or remainder of the bandwidth may be transferred over the serial connection between Devices 0 and 3 and/or Devices 0 and 2 in a first hop, then the data or portion of the bandwidth may be "forwarded" in a second hop to target Device 1. In this way, more data and bandwidth may be routed to Device 1 from Device 0 than would be possible with just the serial communications connection between Device 0 and Device 1.

Further, if multiple identical devices are provided and interconnected in a full mesh, as set forth in the present disclosure, information and data can be transmitted to an intermediate device on a first hop, and then transmitted to the target/final device destination on a second hop. For example, if four identical devices are provided, each having input and output beamforming units and it is desired to route 100% of the input beamformer output data from one device to another device's output beamformer input, this can be accomplished despite the fact that each pair of chips has much less bandwidth capacity on the direct connections they share. For example, 25% of the input beamforming traffic may be routed internally on the originating device, while the remaining 75% of the input beamforming traffic may be routed externally to the other three devices s. In this 4-chip multi-device system example, Device 0 may, on a first hop, keep 25% of the bandwidth on Device 0, transmit 25% of the bandwidth to Device 1, transmit 25% of the bandwidth to Device 2, and transmit 25% of the bandwidth to Device 3. Once the data is received in the receive buffers for each device for the first hop route, a second hop route may be performed. On the second hop route, each of the four devices can forward the beamforming traffic using its dedicated external or serial communications connection to the target device. Any data which reached the destination device on the first hop can be routed internally for the second hop, while the remainder of the data will be forwarded to the target destination devices during the second hop. Once the second hop-routed data is received in the receive buffers of each device, the output beamforming operation may begin. This two-hop routing scheme is accomplished and enabled by cascading two routing stages together sequentially on any one device. Which device performs the cascaded route depends on the where the data to be beamformed originates from, as a cascaded route stage remains local to a particular device.

In this way, bandwidth is flexibly and efficiently allocated and processing is distributed to various chips while allocating the desired amount of routing bandwidth to each stage, ensuring that aggregate SerDes lanes capacity is not exceeded.

It is noted that although the switching network of the present disclosure may, in some examples, be non-blocking, the switching network of the present disclosure is not necessarily, and preferably is not, a Clos switching network. As described above, a Clos switching network has specific structural and spatial design elements and relationships which must be present to be considered a Clos switching network. In some examples of the present disclosure, the peak internal bandwidth of potentially routable traffic exceeds the amount of external (serial link such as, for example, SerDes lanes, LVDS lanes, Serial Peripheral Interface (SPI), MIL-STD-1553A/B, SpaceWire, and the like) bandwidth available. In such examples, the routing network must selectively apply blocking (via arbitration) to throttle the peak bandwidth down to the threshold which is externally routable. The key criterion from a performance perspective is to keep the external serial links operating near peak bandwidth. Since that bandwidth is known in advance, it can be allocated appropriately across the number of active routing stages so as to never exceed the maximum limit. Accordingly, the present switching network could considered Clos-like, or functioning as or having an algorithm emulating a Clos switching network only in the sense that it provides non-blocking switching. But it is emphasized that the present disclosure's structure and functionally does not meet the strict definition of a Clos switching network. Instead, the present disclosure's switching network may include a mixture of time-based and spatial switches, such as time slot interchangers (TSI), switches including an Arbiter capable of granting requests from a limited number of the active routing stages during a given window of time, and/or providing an even number of switching stages in each routing stage. In some examples, the switching network may have 2 or 4 switching stages per routing stage, while in other examples the switching network 410 may include 6 switching stages per routing stage.

Under the architecture of the present disclosure, data may be routed from any routing stage to any other routing stage by decoding packet header fields indicating the desired receive (Rx) routing stage and slot (e.g., sub-channel or beam index) and delivering the packets there. Data may be routed backwards in time from later pipeline stages to earlier stages, or forward in time across multiple pipeline stages. The routing network supports a tremendous amount of flexibility to route data in any way desired for a given application, as well as in ways which might not be envisioned initially, or even in ways which might be considered impractical or non-useful, but which are within the scope of the present disclosure. Each device has a certain amount of serial link (e.g., SerDes lanes, LVDS lanes, Serial Peripheral Interface (SPI), MIL-STD-1553A/B, SpaceWire, and the like) bandwidth available, and that bandwidth may be allocated across the system as desired for a given configuration—allowing any sub-channel or beam from any routing stage input to be routed to any sub-channel or beam slot (index) of any other routing stage as long as peak routing bandwidth (in some examples maximum SerDes capacity) is not exceeded. The functionality described above is not possible using prior art systems such as the one shown in FIG. 2 where one rank or column of devices communicates exclusively with the next rank or column of devices in the pipeline, regardless of whether those prior art systems utilize Clos switching networks.

A step-by-step conceptual example of creating an example of a folded chip architecture to implement beamforming, channelization, and routing functionality is depicted in FIGS. 5-9 and described below. The folded architecture may reduce the number of serial communication connections required to implement beamforming, channelization, and routing functions while increasing the system's overall flexibility and scalability. This also has the advantage of lowering the power expenditure while enabling full pipeline integration into a single device (e.g., performing input beamforming, output beamforming, channelization, reconstruction, ADC, DAC, and signal routing in a single package and/or on a single chip, wherein the package(s) may be provided on a board such as a PCB, a card, and the like along with other substantially similar packages and other electrical components). Note that the steps depicted in FIGS.

5-8 are intended to provide a conceptual understanding of the folded chip architecture of the present disclosure, and need not actually be performed.

Figure 5:
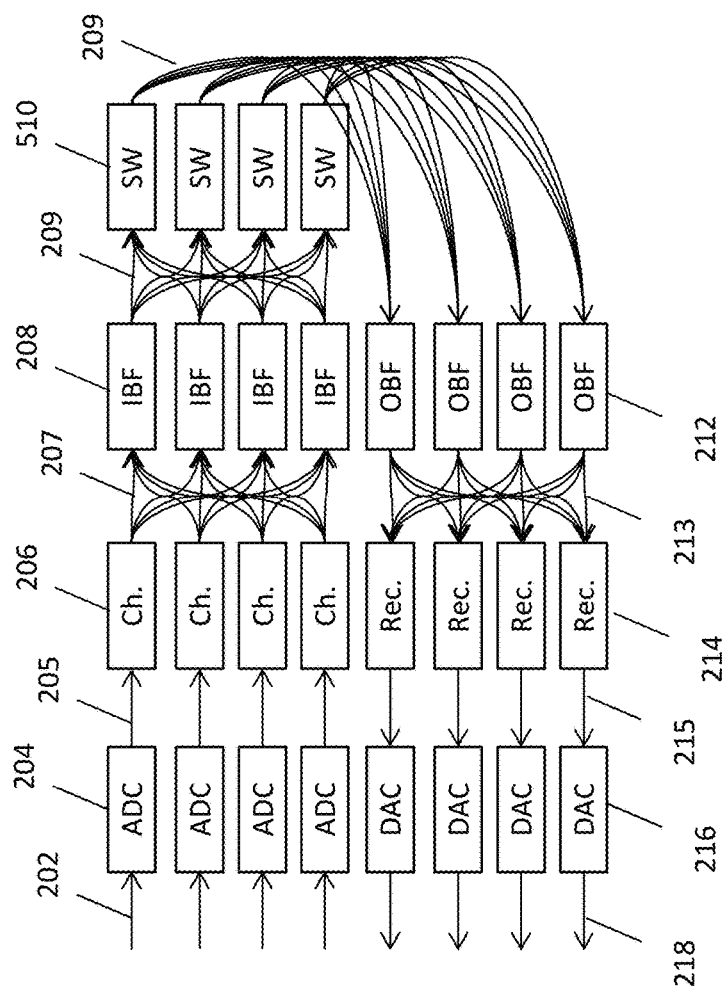
FIG. 5 depicts the first step of conceptually folding a channelization, beamforming, and routing architecture.

FIG. 5 depicts a first conceptual folding step relative to the architecture depicted in FIG. 2. In this figure, each box (e.g., 204, 206, 208, 210, 212, 214, 216) still represents one physically distinct device, such as a chip or integrated circuit, and each arrow (e.g., 202, 205, 207, 209, 213, 215, 218) represents one or more desired routing paths which typically correspond to direct physical connections (e.g., physical wires, conductive traces, and the like). As previously mentioned, the inter-chip communication connections are typically implemented as serial communication connections, such as serializer/deserializer (SerDes) lanes, LVDS lanes, Serial Peripheral Interface (SPI), MIL-STD-1553A/B, SpaceWire, and the like, while on-chip communication is often implemented using parallel communication connections such as physical wires, conductive traces, and the like. In some embodiments, the switch network 510 of FIG. 5, which again is an intermediate conceptual step and not the routing network of the present disclosure, may still be implemented as a multi-stage switch network such as the switching networks depicted in FIG. 3. In other examples the switch network 510 may be non-blocking like a Clos switch network, but with a divergent structure, different inter-stage input/output requirements, increased flexibility, and increased capability as compared with a Clos switch network. In a preferred example, the switch network 510 is a multi-stage switch network as described in the present disclosure wherein an even number of switching stages is provided on a particular data signal path, where the switching stages including a mixture of spatial switches and time-based switches (e.g., TSI switches, or spatial switches which may include an arbiter and/or Interlaken protocol, such as the JESD204B or JESD204C protocol, and the like).

Figure 6:
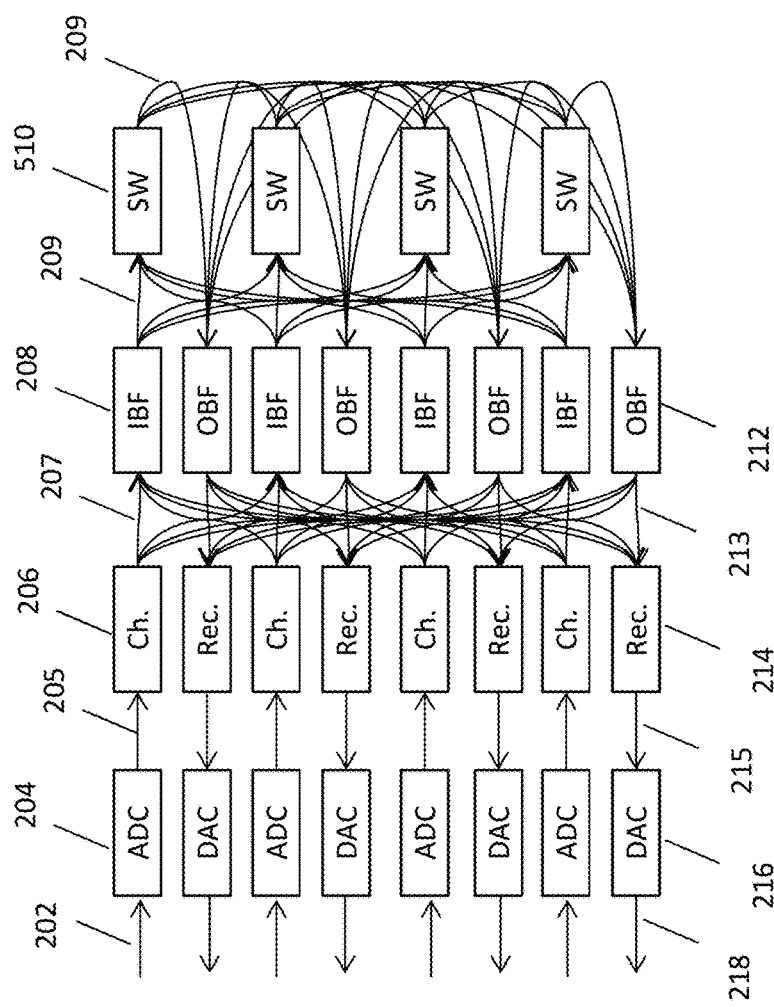
FIG. 6 depicts the second step of conceptually folding a channelization, beamforming, and routing architecture.

FIG. 6 depicts a second conceptual folding step showing the same chips and desired routing paths as FIG. 5 conceptually rearranged to interleave or "fold" the channelizer circuits 206 and reconstructor circuits 214, the input beamformer circuits 208 and output beamformer circuits 212, and the ADCs 204 and DACs 216. The desired routing paths between the functional blocks have not changed as compared with FIG. 5. This arrangement conceptually highlights the potential for partitioning the functional blocks into identical groups, which can, in turn, be implemented in multiple identical devices as will be described below with respect to FIG. 9.

Figure 7:
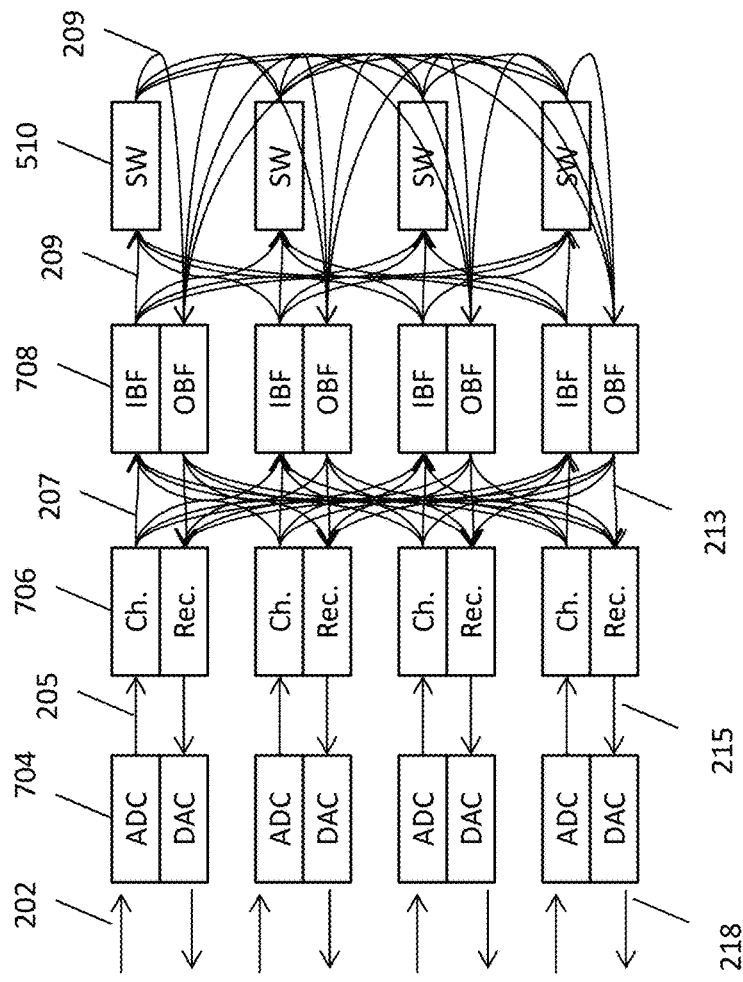
FIG. 7 depicts the third step of conceptually folding a channelization, beamforming, and routing architecture.

FIG. 7 depicts a third conceptual folding step. FIG. 7 depicts the same functionality as depicted in FIG. 6, but the functional blocks have been further grouped by functionality and combined into chips. For example, instead of using separate ADC and DAC chips, each ADC circuit is paired with a DAC circuit on a combined ADC/DAC chip 704. Similarly, each channelizer circuit is combined with a reconstructor circuit on a combined channelizer/reconstructor chip 706, and each input beamformer circuit is combined with an output beamformer circuit in a combined beamforming chip 708. This hardware-level simplification is possible because each pair of functional blocks requires similar circuitry and/or algorithms for implementation. For example and without limitation, the channelizer and reconstructor functions may be implemented using the same or similar circuitry and/or algorithms, since both functions can use similar types of time- or frequency-domain processing. Similarly, the input beamformer and output beamformer functions can be implemented using the same or similar circuitry and/or algorithms since both use beamforming to produce beam signals.

Figure 8:
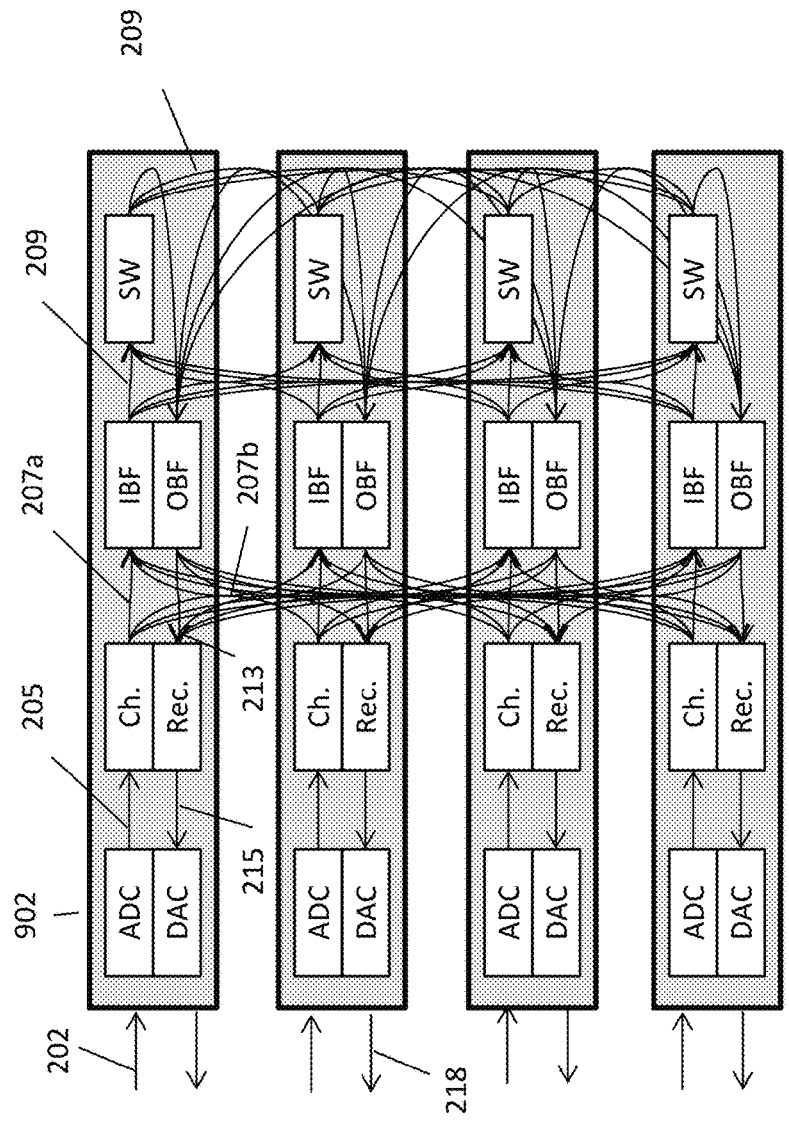
FIG. 8 depicts the fourth step of conceptually folding a channelization, beamforming, and routing architecture.

FIG. 8 depicts a fourth conceptual folding step in which the ADC, DAC, channelizer circuit, reconstructor circuit, input beamformer circuit, output beamformer circuit, and portions of the routing/switching network are combined or integrated into a single chip 802 or a single package. This chip 802 may be an ASIC, for example, or another type of chip such as an FPGA or microprocessor. In some embodiments, the communication connections within a single chip (e.g., 205, 215, 207a) can be implemented with parallel communication connections (e.g., physical wires, conductive traces, and the like, since no I/O pins are required), while the off-chip communication connections (e.g., 207b and 209) can be implemented using serial communication connections such as SerDes lanes. Thus, as compared with FIG. 2 and FIGS. 5-7 which require SerDes lanes between all circuits and chips (e.g., 204, 206, 208, 210, 212, 214, 216 in FIGS. 2 and 5-6, or 704, 706, 708 in FIG. 7), the same functionality may be implemented in FIG. 8 but with fewer overall serial communication connections. Since SerDes lanes require a significant amount of power and die space, this provides the advantage of reducing power consumption. It is also noted that providing the ADC, DAC, channelizer, reconstructor, and beamformers in a single package quick, low-latency detection and recovery from radiation effects and upsets from single event effects (SEE), single event upsets (SEU), single event transient (SET), and the like.

Figure 9:
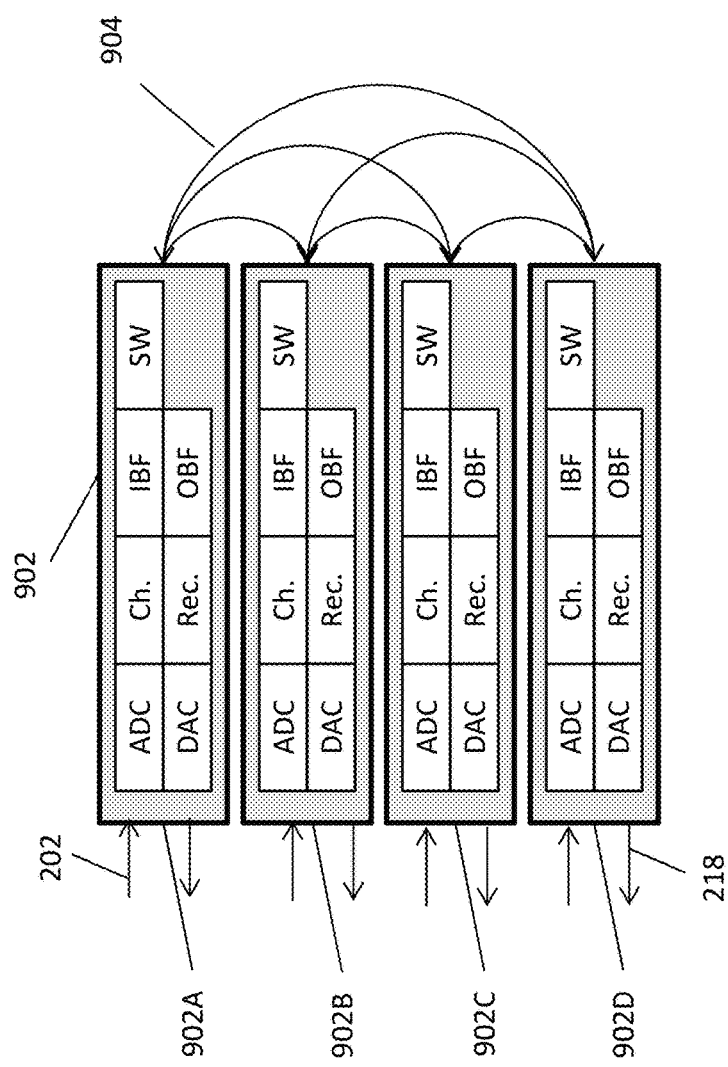
FIG. 9 depicts the fifth step of conceptually folding a channelization, beamforming, and routing architecture.

With reference now to FIG. 9, the communication connections have been further simplified such that paths that would have started and ended at the same chip 802 in FIG. 8 have been eliminated, and instead all of the remaining inter-chip wiring connections depicted in FIG. 8 have been bundled into three bidirectional communication connections 904 per chip 902A-D, with each bidirectional communication connection requiring two wire pairs. A bundle behaves as a wider, faster serial communication connection in which data is striped across the lanes, using a striping protocol such as, for example, the Interlaken protocol. Thus, in some examples, the switch network is compatible with the Interlaken protocol.

The exemplary folded chip architecture depicted in FIG. 9 depicts plural identical chips 902A-D having transmit and receive processing circuitry folded back onto the same chip in spatial and/or temporal proximity. Each chip 902A-D includes at least one ADC, DAC, channelizer, reconstructor, input beamformer, output beamformer, and a routing or switching network. The switch networks are configured to receive and route a variety of signal types to other circuitry on the chip and/or between chips. For example, a sub-channel signal arriving at a chip 902A via a switch network on a chip 902A may be routed to a beamformer circuit and/or reconstructor circuit on the same chip 902A or may be routed off chip to a switch network on a different chip 902B, 902C, or 902D, for example. An RF input signal 202 arriving at the chip 902A may be provided to a channelizer circuit and channelized into sub-channels on the same chip 902A, and then routed, via the switch network, to a beamformer circuit or reconstructor circuit on the same chip 902A, or routed off-chip via the switch network of chip 902A a beamformer and/or reconstructor circuit on chip 902B, 902C, or 902D. Thus, the bundled communication connections 904 depicted in FIG. 9 may carry multiple types of signals (sub-channels, input beam signals, output beam signals) associated with different routing stages of the pipeline, in contrast to the communications connections depicted in FIG. 2 or 3 which only carry a specific type of signal at any one time. In the exemplary architecture of FIG. 9, serial communication connections 904 arriving at or departing from switch network on chip 902A, 902B, 902C, or 902D may carry sub-channel signal or beam signal types, depending on how the switch network is configured to operate.

To enable multiple types of signals to use the same communication connections, in some embodiments, the switch network is capable of using time division multiplexing (e.g., time-domain interleaving) of the different types of signals. Such time-domain interleaving may be performed by routing algorithms within the switches in each chip to flexibly route data through one or more hops between chips to its final destination chip. For example, a switching network of chip 902A may include a routing table which directs all of or a portion of wideband or RF input signal-traffic (i.e., an RF signal having a plurality of channels or subchannels therein) to one or more of the other chips 902B-D. If, for example, 100% of wideband or RF input signal data is beamformed and intended to be transmitted to chip 902D, this may be performed by hopping or transmitting a portion of the data over serial communications connections 904 to another chip 902B-D.

It is noted, however, that although the proportion of data which is to be transmitted over the serial communications links 904 is described in this example as being evenly split, the present disclosure is not limited to this. Any relative proportion of data may be transmitted among the chips 902A-D depending on available capacity and utilization of serial communication connection 904.

The folded chip architecture depicted in FIG. 9 has a number of advantages. First, by providing each chip 902A-D in FIG. 9 with ADC, DAC, channelizer, reconstructor, and switch network circuits, the folded chip architecture eliminates serial communication connections that would have started and ended at the different specialized chips (e.g., chips 204, 206, 208, 210, 212, 214, 216 in FIG. 5 or 6), thereby reducing the total required number of serial communication connections (e.g., SerDes lanes, LVDS lanes, Serial Peripheral Interface (SPI), MIL-STD-1553A/B, SpaceWire, and the like), with a corresponding reduction in power consumption and die area. Second, by bundling the communication connections 904 between chips and using them bi-directionally with time-domain interleaving of various data types (e.g., sub-channel data, beamforming data, etc.), the folded architecture makes more efficient use of the hardware resources while providing similar functionality as the architecture depicted in FIG. 2. For example, if the architecture depicted in FIG. 2 requires 64 unidirectional serial communication connections (64 wire pairs) and 28 discrete chips, the corresponding folded architecture, such as the example of FIG. 9, may require 24 bi-directional communication connections (48 wire pairs) and four discrete chips. The 48 wire pairs may be bundled into 6 bundles of 4 bi-directional lanes to reduce die area. It is noted that FIG. 9 depicts each bundle as a single line 904.

Figure 10:
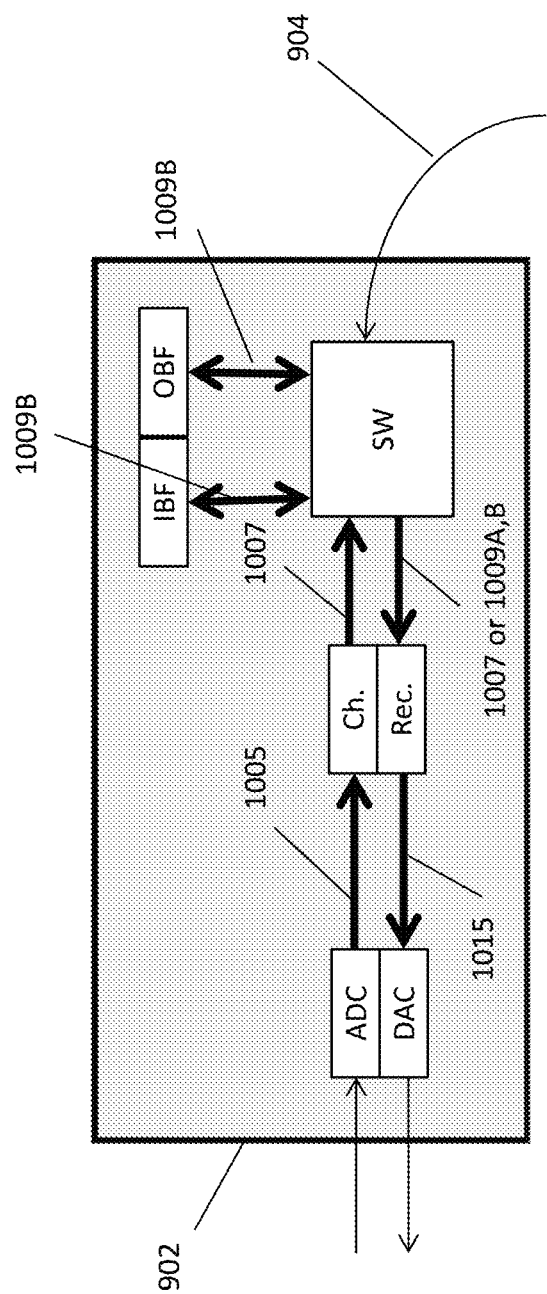
FIG. 10 depicts exemplary on-chip communication connections in a folded chip architecture.

FIG. 10 depicts exemplary internal (on-chip) communication connections in the chips 902A-D depicted in FIG. 9. Communication connections that stay on-chip may be implemented as parallel signal lines (e.g., physical wires, conductive traces, and the like), while communication connections that leave the chip (external) may be implemented as serial signal lines (e.g., SerDes lanes, LVDS lanes, Serial Peripheral Interface (SPI), MIL-STD-1553A/B, SpaceWire, and the like). As depicted in FIG. 10, on-chip signal paths may include ADC-channelizer path 1005, channelizer-switch network path 1007, switch network-input beamformer path 1009A, and DAC-reconstructor path 1015, reconstructor-switch network path 1013 (which may in some examples be signals transferred over paths 1007, 1009A, and/or 1009B), and switch network-output beamformer path 1009B. Thus, the switch network can receive (e.g., via on-chip communications connections) sub-channels from the channelizer circuit and provide sub-channels directly to the reconstructor circuit (e.g., via paths 1007) without performing beamforming. The switch network can also receive input beam signals and/or output beam signals from the input beamformer circuit and output beamformer circuit (which may in some examples be the same circuit). Thus, the switch network of the present disclosure is capable of routing sub-channels directly from a channelizer circuit to a reconstructor circuit (without beamforming), or routing sub-channels to the input beamformer circuit, and/or routing output beams from the output beamformer circuit to the reconstructor circuit, for example. Since the signal paths 1005, 1007, 1009A-B, and 1015 are parallel signal lines (e.g., physical wires, conductive traces, and the like) and are provided on the same chip, these parallel signal lines may be high speed, relatively short, low-resistance traces connecting the respective ADC, channelizer, switching network, beamforming, reconstruction, and DAC circuits. As previously noted, because the switch network can also route signals off-chip (over serial communication connection 904, for example), a sub-channel from one chip may be routed, by the switch network, to an input beamformer circuit on another chip, for example.

In addition to the benefits associated with above-described hardware optimizations, the digital folded chip architecture of the present disclosure yields benefits in terms of operational flexibility and scalability. In the folded architecture, each off-chip communication lane or lane bundle can participate in any or all layers of a multi-layer network simultaneously, since each off-chip communication connection can be shared directly or indirectly between multiple meshed layers. This flexibility is enabled by the fact that, in the folded chip architecture, each communication connection can potentially carry input beamforming signals, output beamforming signals, and/or sub-channel signals, and these signal types can be time-domain interleaved on the same lane for transmission among any of the chips in the meshed multi-layer chip network. FIG. 9 depicts an exemplary use of the folded chip architecture to implement a single-layer network as described above.

Figure 11:
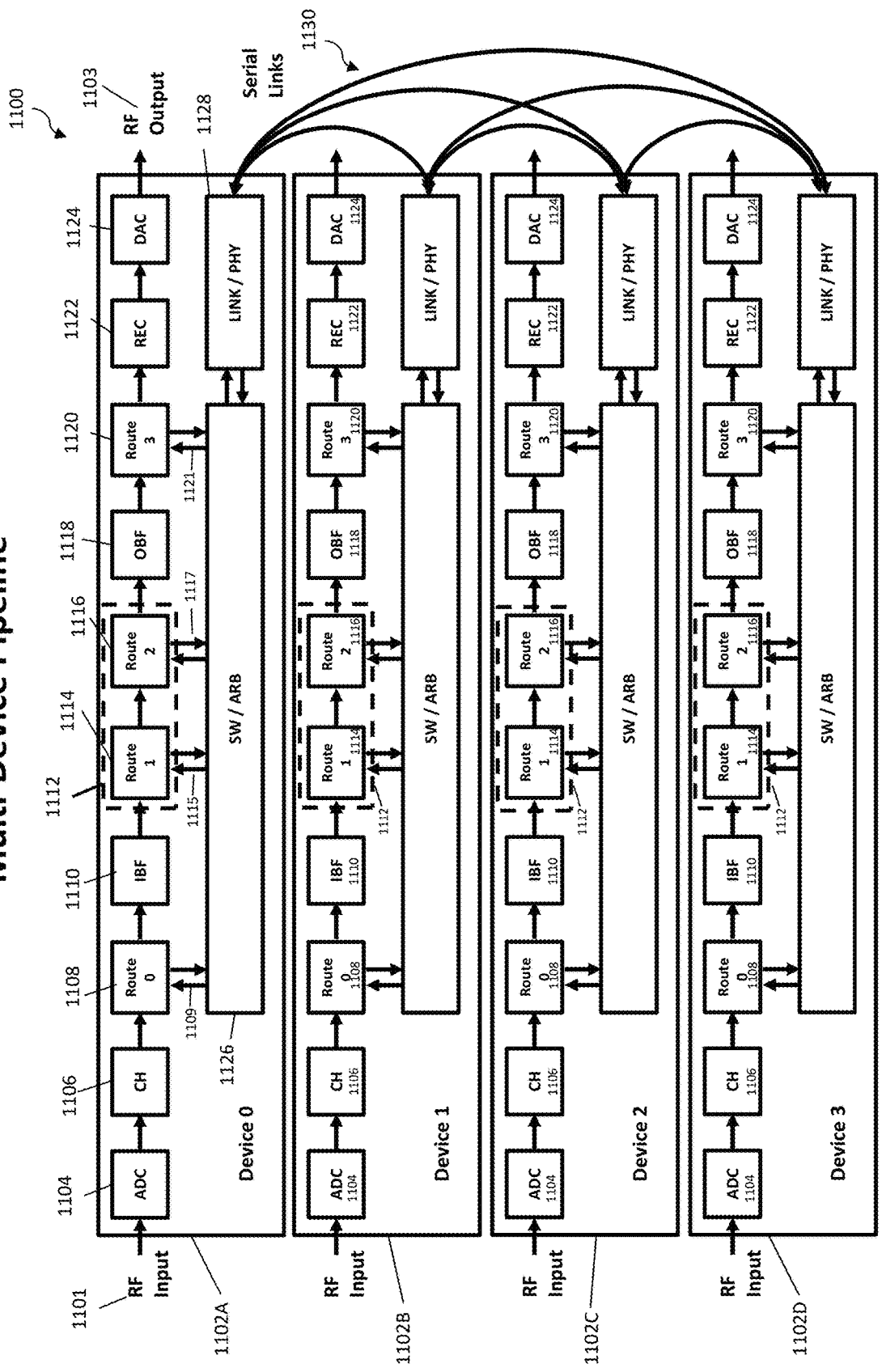
FIG. 11 depicts an exemplary multi-device network based on a folded chip architecture as disclosed herein.

With reference to FIG. 11, a data signal pipeline is illustrated for a multi-device system 1100 similar to the folded chip architecture of FIG. 9. The multi-device system 1100 may include a plurality of devices 1102A-D. The plurality of devices 1102A-D may in some examples be substantially similar to the devices 1105 as discussed above with respect to FIG. 4A-4D and may in some examples function similarly to the devices 1105. Each device 1102A-D may include an ADC 1104, a channelizer 1106, a routing stage 1108, an input beamformer 1110, an internal route stage 1111, a cascaded routing stage 1112 including routing stages 1114 and 1116, an output beamformer 1118, a routing stage 1120, a reconstructor 1122, and a DAC 1124. It is noted that a cascaded routing stage 112 may be two or more routing stages connected in series with each other. RF input signals 1101 may be input to the device 1102A at the ADC 1104 and RF output 1103 may be output by DAC 1124. Routing stages 1108, 1114, 1116, and 1120, which may in some examples be time-based switches such as time-slot interchangers (TSIs) may be communicatively and bidirectionally coupled with an arbiter/switch 1126. An arbiter/ switch 1126 may include an arbitration algorithm can decide which packet requests from each of the (up to 4) active routing stages will be forwarded to the Link/PHY layer 1128 in a given period of time (such as, for example, a clock cycle). Because internal peak bandwidth (between the router stages and arbiter/switch) can potentially exceed external Link/PHY bandwidth, an arbitration algorithm may be employed to throttle the data down to the rate which can be serviced by the Link/PHY layer. In one example, granting up to 2 packet requests per cycle may be sufficient to ensure than maximum transmission (Tx) bandwidth can be supported across the Link/PHY layer 1128. Once data has been passed to the Link/PHY layer 1128, it can be output on a link/phy layer 1128 to serial communication connections 1130 (e.g., SerDes lanes, LVDS lanes, Serial Peripheral Interface (SPI), MIL-STD-1553A/B, SpaceWire, and the like).

As can be seen in FIG. 11, the routing stage 1108 allows channelization signals from channelizer 1106 to optionally be routed to input beamformer 1110 or to the arbiter/switch 1126. In one example, the channelization signals from channelizer 1106 on chip 1102A may be internally routed via an internal route path to a reconstructor 1122 without passing through the arbiter/switch 1126. In this way, the device 1102A may be configured to perform channelization and reconstruction by reconstructor 1122 of an RF input signal 1101 using only internal, on-chip routing paths and output the RF output signal 1103 via DAC 1124. Alternatively, the channelization signals from channelizer 1106 may be routed, via routing stage 1108 and arbiter/switch 1126, to a link/phy 1128 for transmission over serial communication links 1130 to another device 1102B-D. The channelization signals from channelizer 1106 of chip 1102A may then either be reconstructed by a reconstructor 1122 provided on a chip 1102B, 1102C, or 1102D, or may be selectively routed to an input beamformer 1110 and/or output beamformer 1118 on a chip 1102B-D before being reconstructed by a reconstructor 1122 on one of the chips 1102A-D.

In another example, channelization signals from channelizer 1106 of chip 1102A may be routed via routing stage 1108 to an input beamformer 1110 on chip 1102A. The beams from input beamformer 1110 may be selectively routed, via routing stage 1114, to an arbiter/switch 1126. Alternatively, beams from input beamformer 1110 may be routed within a cascaded routing stage 1112 to routing stages 1114 and 1116 to keep the beams on the same chip 1102A. At routing stage 1116, the beams from input beamformer 1110 may then be routed to output beamformer 1118. Alternatively, at routing stage 1116, beams from input beamformer 1110 of chip 1102A may be routed via parallel signal lines 1117 to arbiter/switch 1126. Beams which are routed via routing stages 1114 and/or 1116 to arbiter/switch 1126 may be selectively distributed and routed to output beamformers 1118 of other chips 1102B-D via arbiter/switch 1126 to link/phy 1128 and serial communications links 1130.

The routing stages 1108, 1114, 1116, 1120 may be time-based routing switches such as, for example, time-slot interchangers, and may include a memory for storing routing tables which contain the desired source-to-destination routing paths for a particular system configuration. These desired routing paths will generally be a combination of internal and external routes. These routing tables, which may in some instances may be referred to as configuration information, may be reconfigurable by a remote device or user or may be reconfigured on a periodic basis to provide optimized service to the users of the satellite based communications system. By providing a cascaded routing stage 1112 consisting of two routing stages 1114 and 1116, a portion of the signal bandwidth can be kept on-chip (internal route) while another portion of the signal bandwidth may be routed, via arbiter/switch 1126, link/phy 1128, and serial communication links 1130, to other chips (external route) in the multi-device system 1100.

Although not depicted, the folded architecture may be extended to any number of devices connected via a full mesh or other connection topologies. The key consideration is the amount of bandwidth required to be routed externally, relative to the amount of external bandwidth available in given device. In cases where higher bandwidth is required between localized groups of devices, topologies can be constructed to provide higher bandwidth within a group and then connect the groups together using a lower bandwidth full mesh or other topology.

Although not depicted, but logically extending from the advantages of the folded processor architecture, if a fifth device 1102E (not shown) were added, one could keep, for example, 20% of the signal bandwidth on chip 1102A while transmitting, for example, 80% of the signal bandwidth to the other 4 chips 1102B-1102E.

As discussed above, Each routing stage illustrated in FIG. 11 may contain a routing table, which may include information to associate source packets (subchannels or beams) with destination packet slots (subchannels or beams), physical port assignments (target bundle of SERDES lanes), target receive routing stage (IBF, OBF, REC), internal route flags for keeping data signals on-chip, and other possible attributes. This information is typically reformatted and inserted as a packet header containing destination routing information and any other desired attributes.

A routing stage may further include memory to allow transposition of data (row-to-column or vice versa), reordering in time (a time slot interchanger or TSI) for optimal scheduling, or for deskewing receive data. It may further include control logic to process the route table and route all source packets to the appropriate destination port with the destination route address contained in the packet header. With sufficient bandwidth and connectivity between devices and addressability within a device, any incoming source packet can be routed to any destination packet slot in a flexible, reconfigurable, and scalable way.

Certain stages of the pipeline in FIG. 11 could be optionally bypassed to achieve a different function, reducing the number of active processing and routing stages. For example, if beamforming is not required, the IBF and OBF stages could be bypassed internally on-chip. This would remove any routing bandwidth demand for these stages and allow more Link/PHY bandwidth to be allocated to the channelization and reconstruction stages.

FIG. 11 shows an example Switch/Arbiter (SW/ARB) which may perform arbitration among the active routing stages for access to the Link/PHY layer. The arbitration algorithm may use prior knowledge of the relative routing bandwidths of the active routing stages to ensure fairness and good load balancing, while keeping the Link/PHY layer operating at high efficiency. The arbiter generally needs to send data at a high enough rate to keep transmit first in, first out buffers (FIFOs) full within the Link layer. Once a FIFO fills beyond a target threshold (high water mark), future packet transmissions will be halted until the FIFO drains below its resume threshold (low water mark).

The Link/PHY layer is shown abstractly and may include OSI Network Model Layers 1 and 2, which may include Physical Coding Sublayer (PCS), Physical Medium Attachment (PMA) and SerDes sub-modules.

It should be noted that the Link/PHY layer is a limited resource which must be shared across the active routing stages. One benefit of the digital folded architecture is that bandwidth may be flexibly allocated between routing stages as mission requirements or target applications vary, without over-provisioning for rare but important use cases, while keeping as much data internal as possible to save power.

Unlike other systems, the disclosed digital folded architecture can be configured to behave as one or more of a variety of network types, such as a single-layer network, a two-layer network, or a three-layer network, each of which may be based on the use of non-blocking network topologies, for example. In the folded architecture, signals can be routed in such a way as to guarantee arbitrary multicast and arbitrary any-to-any routing between input sub-channels (i.e., signals produced by the channelizer circuit) and output sub-channels or output beams (e.g., signals provided to the DAC from the reconstructor and/or beamformer, respectively). In some examples, a primary constraint on the switch network of the present disclosure may be to ensure that serial communication lanes (e.g., SerDes or LVDS lanes) are efficiently used and that the amount of bandwidth being routed over them does not exceed the serial communication lane capacity.

In any device with a fixed number of serial communication lanes (e.g., SerDes lanes, LVDS lanes, Serial Peripheral Interface (SPI), MIL-STD-1553A/B, SpaceWire, and the like), there is a peak bandwidth capacity which can be supported on these lanes. If this bandwidth is less than the theoretical peak routing bandwidth of all processing stages combined (such as the maximum bandwidth processed by the channelizer, reconstructor, and input and output beamformers), then the bandwidth must be allocated for each processing stage so as not to exceed the maximum capacity of the lanes. Said another way, the routing tables and switching algorithms must be configured so as to not exceed SerDes lane capacity between chips. The routing or switching network of the present disclosure can support fully flexible any-to-any routing without necessarily routing the peak internal bandwidth demand over the serial communication lanes. This is at least partly enabled by allowing for cascaded routing of data on-chip, thus reducing the amount of data to be routed over the serial communication lanes. As long as the routing protocol (e.g., via packet header, channel routing configuration, etc.) provides sufficient addressability to any desired destination chip, processing stage, and sub-channel/beam slot—as set forth in the present disclosure—a structural Clos network is not required and would actually be detrimental to the present disclosure's routing network. In particular, the switching and routing network architecture of the present disclosure involves time-based and spatial switches in the routing path, includes only even numbers of switching stages in each routing stage, and uses routing tables and packet headers to properly route each of the various data streams utilized in a given system configuration. A system utilizing Clos switching stages between one or more processing stages would not allow for the flexibility and scalability enabled by the switching network of the present disclosure.

In some embodiments, the digital folded architecture can even be configured to simultaneously operate as multiple types of networks using time-domain interleaving, by providing the switch networks appropriate configuration information by providing a reconfigurable routing table capable of selecting routing destinations for various types of data signals (e.g., sub-channels, beamformed signals or beams and the like) on-chip or at a processing stage (channelizer, reconstructor, beamformers, etc.) on a different chip. In some embodiments, it may be possible to use half of the available communication connection bandwidth and switching hardware (e.g., switch network) of a folded chip architecture to implement a two-layer mesh network, and the remaining bandwidth and switching hardware to implement a three-layer mesh network using the same hardware. This can be accomplished by interleaving the signals on the communication connections and configuring the switch network to perform switching for each interleaved signal based on the appropriate network topology. In some embodiments, a portion of the switch inputs and outputs may be configured to implement (for example) a strictly non-blocking network, while the remaining switch inputs and outputs may be configured to implement a rearrangeable non-blocking network. It is noted, though, that as discussed above the switching networks of the present disclosure are structurally and functionally distinct from a Clos switching network, even if both types of switching networks appear similar in that both provide non-blocking functionality.

In contrast, in another circuit-switched architecture such as depicted in FIG. 2, only a single network topology can typically be operable within a given hardware configuration, because the communication connections 205, 207, 209, 213, 215 are dedicated pathways between a given pair of processing stages and would only be carrying one type of signal particular to that processing stage.

From an operational standpoint, an array of chips implementing the folded chip architecture (e.g., as part of a payload on a satellite) may be remotely configured (e.g., from the ground) to operate as a desired network topology (e.g., two-layer mesh, three-layer mesh, non-blocking, etc.) by transmitting appropriate configuration data to the satellite. In this manner, the same hardware (e.g., including chips implementing the folded chip architecture) may be dynamically reconfigured to operate as a different network topology, by transmitting new configuration data to the satellite. Such flexibility is not possible with other architectures.

The above-described folded architecture also provides scalability advantages relative to other architectures. As described below, additional chips and/or network layers can be added to a system without necessarily requiring additional physical communications lanes to be added to the chips.

The beamforming and channelization portion of communications satellite systems is typically physically implemented in columns and rows of chips, such that a chip within one column communicates with all chips in the column to the left and all chips in the column to the right. This general approach is depicted in the simplified drawing of FIG. 12, in which switching chips communicate with input beamforming (IBF) chips to the left and output beamforming (OBF) chips to the right.

Figure 12:
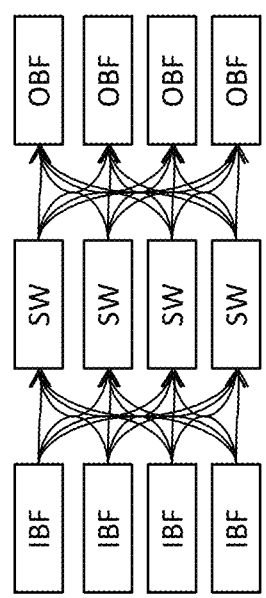
FIG. 12 depicts exemplary communication connections between chips.

In other architectures, for a given number of serial communication connections implemented per chip, the chip may directly communicate with only that many other chips (in the limiting case, one chip per communication lane). For example, as depicted in FIG. 12, each switch in the middle of another architecture with four rows would need at least eight communication connections (e.g., SerDes lanes, LVDS lanes, Serial Peripheral Interface (SPI), MIL-STD-1553A/B, SpaceWire, and the like): four to communicate with the input beamforming chips, and four to communicate with the output beamforming chips.

Figure 13:
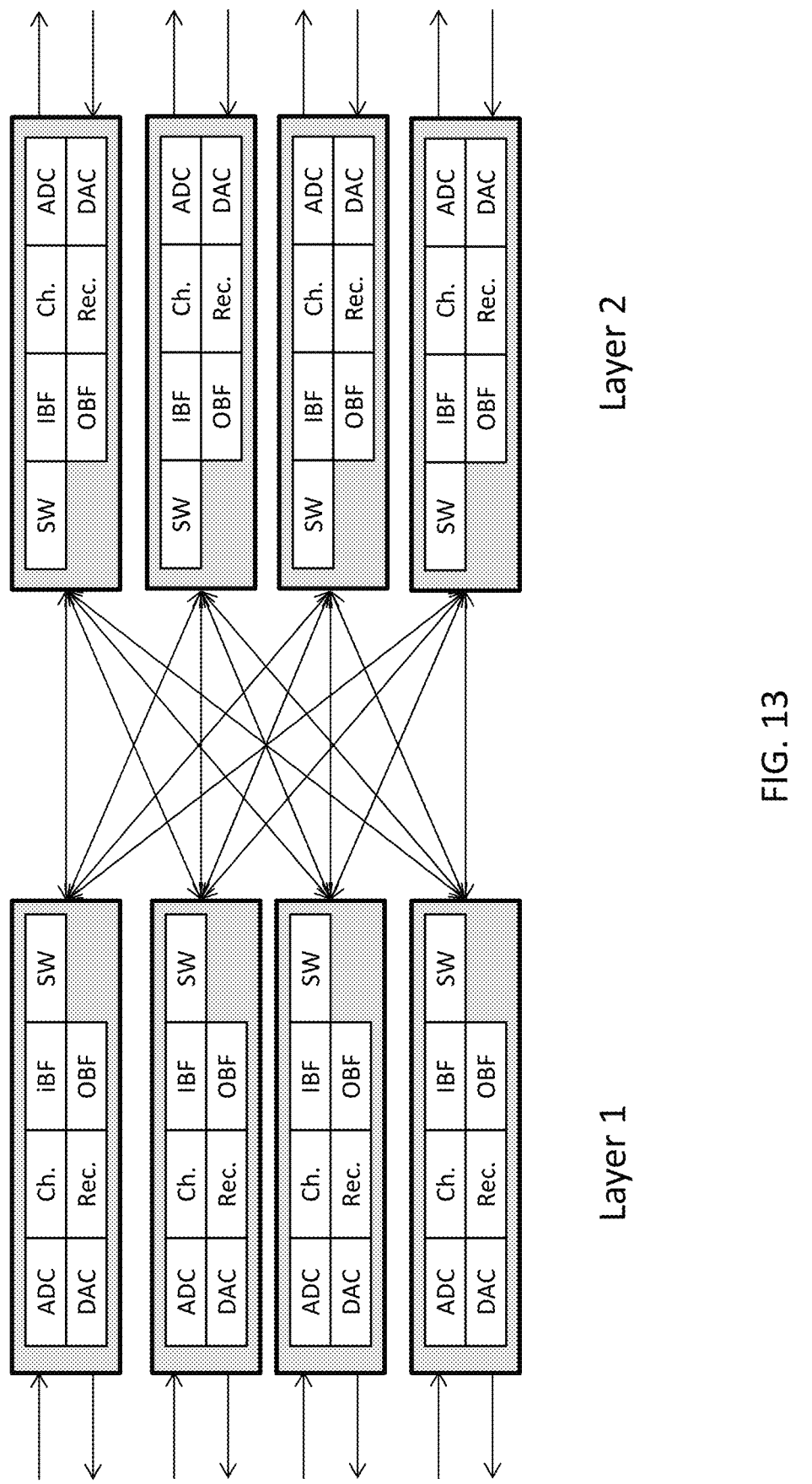
FIG. 13 depicts an exemplary two-layer network based on a folded chip architecture.

In contrast, as depicted in FIG. 13, the disclosed folded chip architecture enables a two-layer network (for example) to be constructed with four rows (eight chips total), such that each folded architecture chip only needs four serial communication connections per chip, but is able to communicate directly with the four folded architecture chips in the other column, and indirectly with the four chips in its own column (via a first hop to a chip in another column then a second hop to a chip in the same column as the originating chip). Thus, the size of the network can be scaled up without necessarily requiring additional serial communications lanes to be implemented on the chips, as long as bandwidth requirements are met for the target application.

While the embodiments described above include beamforming functionality, it is also possible to use these concepts to implement a channelizing-only system, by excluding the input and output beamforming functional blocks from the chip. In this manner, the cost of the chip may be reduced, and the system can optionally be augmented with a layer of programmable or reconfigurable chips (such as FPGAs, for example) to add beamforming and routing with a relatively small increase in the total number of serial communication connections in the system. In contrast, in another architecture, the addition of beamforming to a channelization system adds a significant number of serial communication connections to the system.

Figure 14:
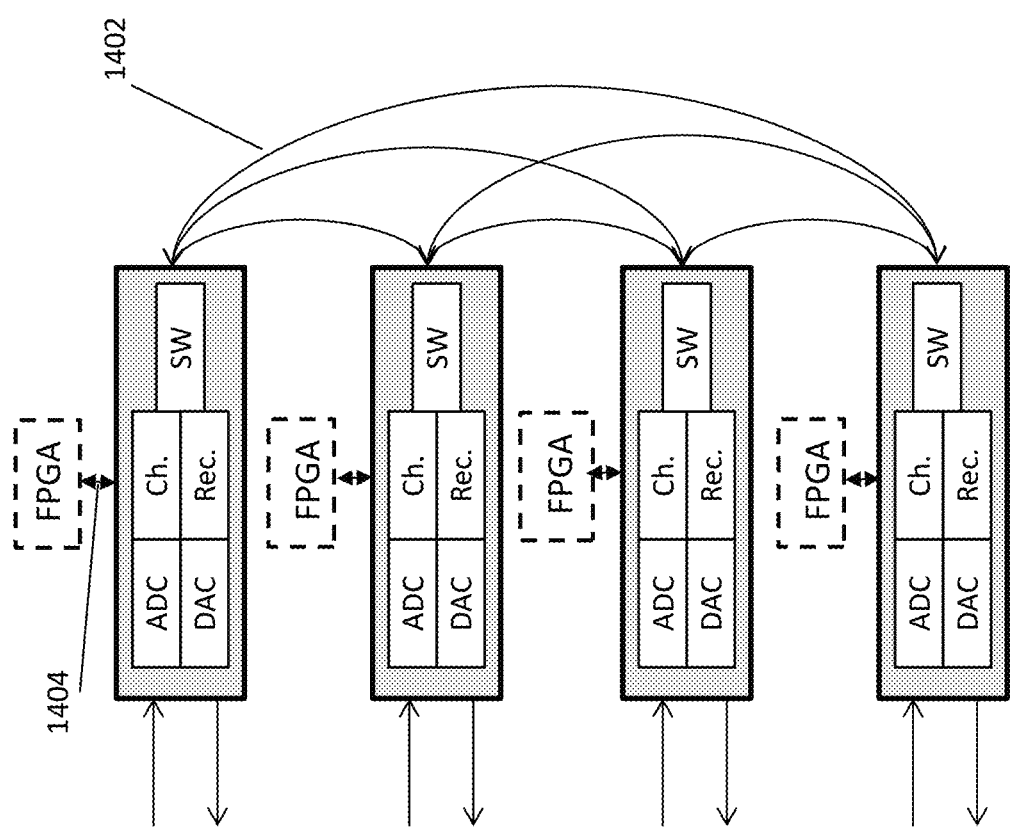
FIG. 14 depicts an exemplary single-layer network based on a channelizing-only folded chip architecture.

FIG. 14 depicts a channelization-only folded architecture augmented with a layer of FPGAs for beamforming. In this approach, the beamforming functionality and associated communication connections are relocated from the channelization/routing chips to the FPGAs. In this example, only four additional communication connections 1404 are added to the system in order to communicate data (such as input beam signals and/or output beam signals) between the FPGAs and the channelization/routing chips; these lanes would otherwise have stayed on-chip. One advantage of this approach is that implementing beamforming in this way is not as expensive from a power consumption perspective as it might first appear. The hardware and computations associated with beamforming are simply relocated from the channelization/routing chip to an FPGA, as are the serial communication transceivers. (The bundled communication lanes 1402 depicted in FIG. 14 thus require fewer wire pairs than the bundles 904 depicted in FIG. 9). Thus, the addition of beamforming functionality via FPGAs may not significantly alter the overall power consumption of the system relative to using a combined beamforming/channelization/routing chip without FPGAs, such as the chips depicted in FIG. 9.

Furthermore, the approach of augmenting a channelization/router chip with an FPGA for beamforming may enable additional flexibility in the system. The FPGA can potentially be configured to implement customer-specific processing requirements, and can potentially perform other computations in addition to beamforming—such as modulation and demodulation (e.g., regeneration), for example.

Figure 15:
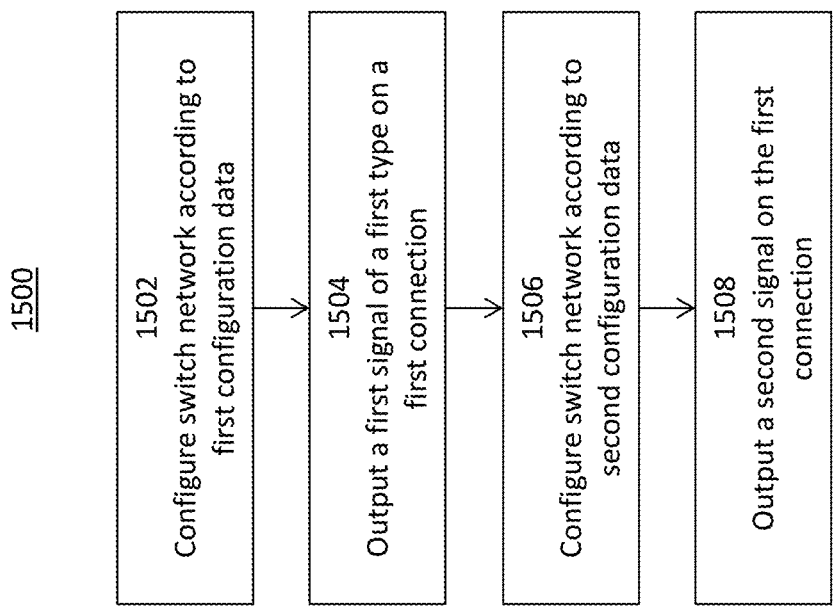
FIG. 15 depicts an exemplary method for configuring a network based on a folded chip architecture.

FIG. 15 depicts a method of dynamically configuring a folded beamforming, channelizing, and routing architecture to operate in different types of networks as discussed above with respect to the communications satellite of the present disclosure. In some embodiments, the method is performed at a digital communication device, such as described in the present disclosure, having a channelizer circuit configured to output a sub-channel signal, a beamformer circuit configured to form an input beam signal or an output beam signal, and a switch network configurable to communicate with the channelizer circuit and the beamformer circuit. The switch network may include a memory or other storage device configured to store configuration data which controls where the various types of signals (i.e., sub-channels, beamformed signals or beams, etc.) are to be routed, including on-chip (internal) and off-chip (external) routing paths as discussed above. The configuration data can be re-configured as needed per the requirements of a particular mission or user.

At block 1502, the switch network is configured to a first configuration according to first configuration data. In some embodiments, the first configuration data may be data that controls the operation of the switching network. In some embodiments, the first configuration data may configure the switching network to operate as a single-layer network, a two-layer network, or a three-layer network, for example. In some embodiments, the first configuration data may configure the switching network to operate as a mesh network, a star network, or any other suitable type of network topology, for example. The first configuration data may be received from a remote external device, such as a high-altitude or terrestrial asset.

At block 1504, while the switch network is in the first configuration, a first signal of a first type is output on a first communication connection of the switch network. In some embodiments, the first signal type may be a sub-channel signal, an input beam signal, or an output beam signal, for example.

At block 1506, the switch network is configured to a second configuration according to second configuration data. The second configuration is different than the first configuration in that the proportion of internal (on-chip) and external (off-chip) processing performed may be altered as compared with the first configuration data. In some embodiments, the second configuration data may be data that controls the operation of the switching network. In some embodiments, the second configuration data is different from the first configuration data. In some embodiments, the second configuration data may configure the switching network to operate as a single-layer network, a two-layer network, or a three-layer network, for example. In some embodiments, the second configuration data may configure the switching network to operate as a mesh network, a star network, or any other suitable type of network topology, for example. The second configuration data may be received from a remote external device.

At block 1508, while the switch network is in the second configuration, a second signal is output on the first communication connection. The second signal is different than the first signal and the second signal is of a second type different than the first type. In some embodiments, the first signal type may be a sub-channel signal, an input beam signal, or an output beam signal, for example, and the second signal type may be a different sub-channel signal, an input beam signal, or an output beam signal, for example. Furthermore, the second configuration information may direct the second signal to different on-chip (internal) or off-chip (external) routing locations.

Radiation Considerations

Due to the ionizing radiation environment experienced by electronics operating in satellite applications, it may be desirable for all or portions of the electronics implementing the folded chip architecture to be radiation hardened or radiation tolerant. This can include any or some combination of electronics that have been radiation hardened by process (having to do with the underlying semiconductor technology regarding how the electronic device is fabricated), by design (having to do with the physical layout of the circuit elements on the die) or by other means. Radiation tolerance may be determined via test, analysis, or test and analysis of devices whose design was not intentionally optimized for use in an ionizing radiation environment.

The harsh environment faced by a satellite can increase the challenge of designing electronic circuitry. One of the primary environmental risks in a satellite application is associated with the ionizing radiation environment present in space. It should be noted that radiation effects associated with ionizing radiation are also present in terrestrial applications and such radiation effects are generally termed soft errors. The ionizing radiation environment in space includes heavy ions, protons, and neutrons which can impact the normal operation of semiconductor devices via single event effects (SEE), total ionizing dose (TID), and/or displacement damage dose (DDD). The effects of TID and DDD are generally cumulative over the mission duration and impact semiconductor parameters including current leakage. The effects of SEE are generally instantaneous and can impact the operation of the semiconductor circuit. These SEE effects include single event latchup (SEL), single event upset (SEU), single event transient (SET), and single event functional interrupt (SEFI). Mitigation for SEL can be provided via use of a technology such as silicon on insulator (SOI). The effects of SEU, SET, and/or SEFI can include causing a serial communication line (commonly referred to as a lane) to go into an invalid state (an example would be loss of lock) in which valid data is no longer being transmitted or received for an extended period of time. The rate of occurrence of soft errors in terrestrial applications for a typical semiconductor chip design is significantly lower than the rate of occurrence of SEU, SET, and/or SEFI for the same semiconductor chip design in space applications.

The mitigation of SEU, SET, and/or SEFI in semiconductor chip designs for space applications can be performed using a variety of techniques including the selection and optimization of materials and processing techniques in the semiconductor fabrication (radiation hard by process (RHBP)), and by the design and fabrication of specialized structures in the design of the chip which is then fabricated via materials and processes in the semiconductor fabrication process (radiation hard by design (RHBD)). There are additional techniques for providing system level mitigation in systems that include semiconductor chips that are either RHBP, RHBD, or standard (not specifically optimized for use in an ionizing radiation environment), such SEU, SET, and/or SEFI mitigation techniques are referred to in this application as system level radiation mitigation techniques (SLRMT).

The effective design of electronics systems for use in the space ionizing radiation environment requires that the system design team make effective and efficient use of components that are either RHBP, RHBD, and/or standard and often includes the use of SLRMT. The optimization of the component selection and SLRMT depends to a large extent on the specific details of the radiation effects that are to be mitigated and the desired level of system radiation tolerance to be obtained. Many SEU, SET, and/or SEFI are generally best mitigated as close as possible, both spatially and temporally, to where the SEE induced event occurred in the component or system level circuit to provide effective and efficient mitigation of such effects. For example, the duration of SET induced in ASIC technology nodes with a feature size <90 nm, can be <1 nSec., and can be as short as several tens of pSec for feature sizes <32 nm. The mitigation of such short duration SET within the same semiconductor package can provide for a more efficient implementation of SET mitigation relative to an approach which spans two or more chips in separate locations within the same system. This efficiency results from the ability to detect and mitigate spatially and/or temporally close to the source of the SEE induced errors.

Radiation test may be accomplished using a beam of charged particles from a particle accelerator where the charged particle beam may include protons and/or heavy ions and the accelerator may be a cyclotron or a linear accelerator. The beam energy in the case of a proton beam may be in the range of 0.1 MeV to over 200 MeV and is typically in the range of approximately >1 MeV to either approximately 65 or 200 MeV. The beam in the case of a heavy ion beam may have a linear energy transfer (LET) in the range of 0.1 to over 100 MeV cm$^2$/mg and is typically in the range of >0.5 to approximately 60 to 85 MeV cm$^2$/mg. The total fluence of particles used in such tests can vary considerably and is often in the range of $10^6$ to over $10^{12}$ particles per cm$^2$ at each beam energy in the case of a proton beam and is often in the range of $10^2$ to over $10^8$ particles per cm$^2$ at each LET value in the case of a heavy ion beam. The number of radiation induced upsets (SEU), transients (SET), and/or functional interrupts (SEFI) is often expressed as a cross section which relates to the number of observed events in a given area (typically 1 cm$^2$) as a function of the beam fluence. The cross section is no greater than 1.0 and can be smaller than $10^{-10}$ cm$^2$, it is often in the range of approximately $10^{-2}$ to <$10^{-10}$ cm$^2$. A device is generally considered to be radiation tolerant if the number of detected SEU, SET, and/or SEFI is sufficiently small that it will not have a significant impact on the operation of the system or circuit containing one or more instances of that device. A heavy ion cross section <$10^{-4}$ cm$^2$ at a LET>37 MeV cm$^2$/mg as demonstrated by test and/or analysis is an example of a cross section which may be sufficient to be demonstrate that a given device is radiation tolerant. The heavy ion or proton cross section that is measured or determined by analysis for a device at one or more beam LET values or beam energy values to be considered radiation tolerant may vary considerably and depends in part on the anticipated orbit for the satellite and the extent to which the circuit and/or system containing that device is capable of maintaining the desired operation when a SEU, SET, and/or SEFI occurs.

All electrical components disclosed in the present disclosure may include at least some type of radiation hardening, radiation tolerance, and/or radiation compensation. Accordingly, the ADCs, DACs, SerDes and other serial communications lanes, inputs, outputs, channelizers, reconstructors, digital signal processors (DSPs), beamformers, may be in some examples radiation-tolerant ADCs, radiation-tolerant DACs, radiation-tolerant inputs, radiation-tolerant outputs, radiation-tolerant channelizers, radiation-tolerant reconstructors, radiation-tolerant digital signal processors (DSPs), and/or radiation-tolerant beamformers. In some examples, partial or complete triple modular redundancy (TMR) may be provided at the potential expense of additional die space or power consumption. In other examples, the use of library cells having physical designs optimized to reduce the probability of SEEs may be used. As discussed above, by providing and integrating these elements in a single package, such as a single monolithic device, single die, multiple dies, or a hybrid device, the detection of radiation induced effects may be quickly detected and corrected or compensated for with low-latency as compared with these circuit elements and processors being provided outside of the package, such as at a different location on the board or card. This is at least partially due to the fact that if the ADC, DAC, reconstructor, channelizer, DSP cores, and/or beamformers are located off-package or outside of an integrated package, radiation-effected signals and radiation correction signals must be passed through physical interfaces such as board or card connectors, solder connections, pins, and the like. This introduces significant delay and may degrade the signal to an extent that radiation effects may not be properly corrected or compensated for. In some examples, the ADCs, DACs, SerDes and other serial communications lanes, channelizers, reconstructors, beamformers, and other electrical components integrated into the single package as disclosed herein may have radiation effects such as SEEs, SEUs, SETs, SEFIs, and the like compensated by use of radiation compensation algorithms provided elsewhere on the chip, package, card, and/or board. This may in some examples include scrubbing algorithms and processes and off-package radiation effects detection and radiation compensation triggering.

Exemplary methods, non-transitory computer-readable storage media, systems, and electronic devices are set out in the following items:

1. An electronic device comprising:
   an analog-to-digital converter (ADC) circuit connected to an input of the electronic device;
   a digital-to-analog converter (DAC) circuit connected to an output of the electronic device;
   a channelizer circuit having an input connected to an output of the ADC, wherein the channelizer circuit is configured to output a first sub-channel signal;
   a first beamformer circuit configurable to receive a second sub-channel signal on an input of the first beamformer circuit and configurable to output a first output beam signal based on the second sub-channel signal;
   a reconstructor circuit configured to receive a first input beam signal on an input of the reconstructor circuit, wherein an output of the reconstructor circuit is connected to an input of the DAC circuit; and a switch network capable of receiving a fourth sub-channel signal from a first external device on a first communication connection and receiving a second input beam signal from a second external device on the first communication connection.
2. The electronic device of item 1, wherein the fourth sub-channel signal and the second input beam signal are received via one or more serial connections to the first external device and the second external device.
3. The electronic device of any one of items 1-2, wherein the switch network is electrically connectable to an output of the channelizer, an input of the first beamformer, an output of the first beamformer, and an input of the reconstructor circuit.
4. The electronic device of any one of items 1-3, wherein the switch network is capable of using time division multiplexing to receive the fourth sub-channel signal and the second input beam signal via the first communication connection.
5. The electronic device of any one of items 1-4, wherein the second sub-channel signal is the first sub-channel signal.
6. The electronic device of item 5, wherein the channelizer circuit is capable of providing the second sub-channel signal directly to the first beamformer circuit.
7. The electronic device of item 5, wherein the channelizer circuit is capable of providing the second sub-channel signal directly to the first beamformer circuit via a set of parallel signal lines.
8. The electronic device of any one of items 1-4, wherein the second sub-channel signal is different than first sub-channel signal.
9. The electronic device of any one of items 1-4, wherein the second sub-channel signal is the fourth sub-channel signal and the switch network is configurable to provide the fourth sub-channel signal directly to the channelizer circuit.
10. The electronic device of any one of items 1-4, wherein the second sub-channel signal is the fourth sub-channel signal and the switch network is configurable to provide the second sub-channel signal directly to the channelizer circuit via a set of parallel signal lines.
11. The electronic device of any one of items 1-10 further comprising:
   a second beamformer circuit configurable to receive a third input beam signal on an input of the second beamformer circuit and output a second output beam signal on an output of the second beamformer circuit.
12. The electronic device of item 11, wherein the first beamformer circuit and the second beamformer circuit are the same circuit.
13. The electronic device of any one of items 1-12, wherein the channelizer circuit and the reconstructor circuit are the same circuit.
14. The electronic device of any one of items 1-13, wherein the channelizer circuit and the reconstructor circuit are implemented on an ASIC.
15. The electronic device of item 14, wherein the first beamformer circuit is also implemented on the ASIC.
16. The electronic device of item 14, wherein the first beamformer circuit is implemented on an FPGA separate from the ASIC.
17. The electronic device of any one of items 1-16, wherein the switch network is compatible with the Interlaken protocol.
18. A method comprising:
   at a digital communication device having a channelizer circuit configured to output a sub-channel signal, a beamformer circuit configured to output a input beam signal or a output beam signal, and a switch network configurable to communicate with the channelizer circuit and the beamformer circuit:
      configuring the switch network to a first configuration according to first configuration data;
      while the switch network is in the first configuration outputting a first signal of a first type on a first connection of the switch network;
      configuring the switch network to a second configuration different than the first configuration according to second configuration data;
      while the switch network is in the second configuration outputting a second signal on the first connection, wherein the second signal is different than the first signal and the second signal is of a second type different than the first type.
19. The method of item 18, wherein the first type is a sub-channel signal or an output beam signal.
20. The method of item 18, wherein the first type is a sub-channel signal, an output beam signal, or an input beam signal.
21. The method of any one of items 18-20, wherein the second type is a sub-channel signal or an output beam signal.
22. The method of any one of items 18-21, wherein the switch network receives the first signal via a serial connection to an external device external to the digital communication device.
23. The method of any one of items 18-22, wherein the switch network receives the first signal from a switch network external to the digital communication device.
24. The method of any one of items 18-23, wherein the switch network receives the second signal from the channelizer circuit or the beamformer circuit.

25. The method of any one of items 18-24, wherein the first signal is the sub-channel signal and the second signal is the input beam signal or the output beam signal.

26. The method of any one of items 18-25, wherein configuring the switch network to a second configuration includes changing the active electrical connections of the switch network based on the second configuration data.

27. An electronic device comprising:
an analog-to-digital converter (ADC) circuit connected to an input of the electronic device;
a digital-to-analog converter (DAC) circuit connected to an output of the electronic device;
a channelizer circuit having an input connected to an output of the ADC, wherein the channelizer circuit is configured to output a first sub-channel signal;
a first beamformer circuit configurable to receive a second sub-channel signal on an input of the first beamformer circuit and configurable to output a first output beam signal based on the second sub-channel signal;
a reconstructor circuit configured to receive a first input beam signal on an input of the reconstructor circuit, wherein an output of the reconstructor circuit is connected to an input of the DAC circuit; and
a switch network capable of receiving a first signal and a second signal on a first communication channel, wherein the first signal and the second signal are different types of signals.

28. The electronic device of item 27, wherein the first signal is the second sub-channel signal and the second signal is the first input beam signal.

29. The electronic device of item 27 or 28, wherein the switch network is configurable to send the first signal to the first beamformer signal and send the second signal to the reconstructor circuit.

30. A satellite communication system comprising:
a first communication circuit having a first analog to digital converter (ADC) configurable to convert a first radio frequency (RF) input signal to a first digital signal, a first channelizer circuit configurable to generate sub-channel signals from digital signals, a first beamformer circuit configurable to generate beam signals, a first reconstructor circuit configurable to generate reconstructed digital signals, a first digital to analog converter (DAC) circuit configurable to convert a reconstructed digital signal to an RF output signal, and a first routing network configurable to route signals of the first communication circuit;
a second communication circuit having a second ADC, a second channelizer circuit, a second beamformer circuit, a second reconstructor circuit, a second DAC, and a second routing network configured to route signals of the second communication circuit;
a communication network having a plurality of communication lanes communicatively coupleable to the first communication circuit and the second communication circuit; and
wherein the first routing network is configurable to transmit a first portion of the first digital signal to at least one of the first channelizer circuit, the first beamformer circuit, or the first reconstructor circuit and to transmit a second portion of the first digital signal different than the first portion to the second communication circuit via the communication network.

31. The satellite communication system of item 30 wherein the second portion is larger than the first portion.

32. The satellite communication system of item 30 or item 31, wherein the first routing network includes a plurality of switching stages and a routing table for configuring the plurality of switching stages.

33. The satellite communication system of any one of items 30-32, wherein the second routing network is configurable to transmit the second portion of the first digital signal to at least one of the second channelizer circuit, the second beamformer circuit, or the second reconstructor circuit.

34. The satellite communication system of any one of items 30-33, wherein the first portion of the first digital signal is a first sub-channel signal and the second portion of the second digital signal is a second sub-channel signal.

35. The satellite communication system of any one of items 30-34 further comprising:
a third communication circuit having a third ADC, a third channelizer circuit, a third beamformer circuit, a third reconstructor circuit, a third DAC, and a third routing network configured to route signals of the third communication circuit, wherein the communication network is communicatively coupleable to the third communication circuit and wherein the first routing network is configurable to transmit a third portion of the first digital signal to the third communication circuit via the communication network.

36. The satellite communication system item 35, wherein the third routing network is configurable to transmit the third portion of the first digital signal to at least one of the third channelizer circuit, the third beamformer circuit, or the third reconstructor circuit.

37. The satellite communication system of any one of items 30-36, wherein the first routing network includes routing paths internal to the first communication circuit to transmit and receive signals among circuits internal to the first communication circuit and external routing paths to transmit and receive signals among other communication circuits.

38. The satellite communication system of any one of items 30-37, wherein the first communication circuit and the second communications circuit are implemented by separate and distinct semiconductor packages.

39. The satellite communication system of any one of items 30-38, wherein the first communication circuit and the second communications circuit are provided in the same satellite payload.

40. The satellite communication system of any one of items 30-39, wherein the first routing network transmits the second portion of the first digital signal via an internal cascaded route of the first routing network.

41. The satellite communication system of any one of items 30-40, wherein the first routing network is capable of transmitting or receiving beamformed signals and sub-channel signals.

42. The satellite communication system of any one of items 30-41, wherein the communication network is capable of communicating beamformed signals and sub-channel signals.

43. The satellite communication system of any one of items 30-42, wherein the communication network includes a plurality of switching stages.

44. The satellite communications system of item 30 or 35, wherein each of the first communication circuit, the second communication circuit, and/or the third communication circuit are integrated in a single package.

45. The satellite communication system item 35, wherein the third routing network is configurable to transmit the third portion of the first digital signal to at least one of the second channelizer circuit, the second beamformer circuit, or the second reconstructor circuit via the communication network.

46. The satellite communication system of items 30 or 35, wherein the first routing network includes a cascaded routing path comprising sequentially routing a first sub-channel signal and/or a first beam signal to at least two routing stages within the first routing network.

47. A non-transitory computer readable storage medium storing one or more programs, the one or more programs comprising instructions, which when executed by one or more processors of a digital communication device having a channelizer circuit configured to output a sub-channel signal, a beamformer circuit configured to output a input beam signal or a output beam signal, and a switch network configurable to communicate with the channelizer circuit and the beamformer circuit, cause the device to perform any of the methods of items 18-26.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although only certain exemplary embodiments and methods have been described in detail above and below, those skilled in the art will readily appreciate that many modifications are possible to the exemplary embodiments and methods without materially departing from the novel teachings and advantages of this disclosure.

The invention claimed is:

1. A satellite communication system comprising:
   a first communication circuit having a first analog to digital converter (ADC) configurable to convert a first radio frequency (RF) input signal to a first digital signal, a first channelizer circuit configurable to generate sub-channel signals from digital signals, a first beamformer circuit configurable to generate beam signals, a first reconstructor circuit configurable to generate reconstructed digital signals, a first digital to analog converter (DAC) circuit configurable to convert a reconstructed digital signal to an RF output signal, and a first routing network configurable to route signals of the first communication circuit;
   a second communication circuit having a second ADC, a second channelizer circuit, a second beamformer circuit, a second reconstructor circuit, a second DAC, and a second routing network configured to route signals of the second communication circuit;
   a communication network having a plurality of communication lanes communicatively coupleable to the first communication circuit and the second communication circuit; and
   wherein the first routing network is configurable to transmit a first portion of the first digital signal to at least one of the first channelizer circuit, the first beamformer circuit, or the first reconstructor circuit and to transmit a second portion of the first digital signal different than the first portion to the second communication circuit via the communication network; and
   wherein the first routing network includes routing paths internal to the first communication circuit to transmit and receive signals among circuits internal to the first communication circuit and external routing paths to transmit and receive signals among other communication circuits.

2. The satellite communication system of claim 1 wherein the second portion is larger than the first portion.

3. The satellite communication system of claim 1, wherein the first routing network includes a plurality of switching stages and a routing table for configuring the plurality of switching stages.

4. The satellite communication system of claim 1, wherein the second routing network is configurable to transmit the second portion of the first digital signal to at least one of the second channelizer circuit, the second beamformer circuit, or the second reconstructor circuit.

5. The satellite communication system of claim 1, wherein the first portion of the first digital signal is a first sub-channel signal and the second portion of the second digital signal is a second sub-channel signal.

6. The satellite communication system of claim 1 further comprising:
   a third communication circuit having a third ADC, a third channelizer circuit, a third beamformer circuit, a third reconstructor circuit, a third DAC, and a third routing network configured to route signals of the third communication circuit, wherein the communication network is communicatively coupleable to the third communication circuit and wherein the first routing network is configurable to transmit a third portion of the first digital signal to the third communication circuit via the communication network.

7. The satellite communication system claim 6, wherein the third routing network is configurable to transmit the third portion of the first digital signal to at least one of the third channelizer circuit, the third beamformer circuit, or the third reconstructor circuit.

8. The satellite communication system of claim 1, wherein the first communication circuit and the second communications circuit are implemented by separate and distinct semiconductor packages.

9. The satellite communication system of claim 1, wherein the first communication circuit and the second communications circuit are provided in the same satellite payload.

10. The satellite communication system of claim 1, wherein the first routing network transmits the second portion of the first digital signal via an internal cascaded route of the first routing network.

11. The satellite communication system of claim 1, wherein the first routing network is capable of transmitting or receiving beamformed signals and sub-channel signals.

12. The satellite communication system of claim 1, wherein the communication network is capable of communicating beamformed signals and sub-channel signals.

13. The satellite communication system of claim 1, wherein the communication network includes a plurality of switching stages.

14. The satellite communications system of claim 6, wherein each of the first communication circuit, the second communication circuit, and/or the third communication circuit are integrated in a single package.

15. The satellite communication system of claim 6, wherein the third routing network is configurable to transmit the third portion of the first digital signal to at least one of the second channelizer circuit, the second beamformer circuit, or the second reconstructor circuit via the communication network.

16. The satellite communication system of claim 1, wherein the first routing network includes a cascaded routing path comprising sequentially routing a first sub-channel signal and/or a first beam signal to at least two routing stages within the first routing network.

17. An electronic device comprising:
- an analog-to-digital converter (ADC) circuit connected to an input of the electronic device;
- a digital-to-analog converter (DAC) circuit connected to an output of the electronic device;
- a channelizer circuit having an input connected to an output of the ADC, wherein the channelizer circuit is configured to output a first sub-channel signal;
- a first beamformer circuit configurable to receive a second sub-channel signal on an input of the first beamformer circuit and configurable to output a first output beam signal based on the second sub-channel signal;
- a reconstructor circuit configured to receive a first input beam signal on an input of the reconstructor circuit, wherein an output of the reconstructor circuit is connected to an input of the DAC circuit;
- a switch network capable of receiving a first signal and a second signal on a first communication channel, wherein the first signal and the second signal are different types of signals; and
- wherein the switch network includes routing paths internal to the electronic device to transmit and receive signals among circuits internal to the switch network and external routing paths to transmit and receive signals among other electronic devices.

18. The electronic device of claim 17, wherein the first signal is the second sub-channel signal and the second signal is the first input beam signal.

19. The electronic device of claim 17, wherein the switch network is configurable to send the first signal to the first beamformer signal and send the second signal to the reconstructor circuit.

* * * * *